United States Patent
Cha et al.

(10) Patent No.: US 10,904,423 B2
(45) Date of Patent: Jan. 26, 2021

(54) IMAGE PROVIDING APPARATUS AND METHOD

(71) Applicant: Hanwha Techwin Co., Ltd., Seongnam-si (KR)

(72) Inventors: Il Hwang Cha, Seongnam-si (KR); Sung Bong Cho, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 16/298,251

(22) Filed: Mar. 11, 2019

(65) Prior Publication Data
US 2019/0289194 A1 Sep. 19, 2019

(30) Foreign Application Priority Data

Mar. 16, 2018 (KR) .................. 10-2018-0031121
May 14, 2018 (KR) .................. 10-2018-0055043

(51) Int. Cl.
*H04N 7/18* (2006.01)
*H04N 5/232* (2006.01)
*H04N 5/247* (2006.01)
*H04N 5/265* (2006.01)
*H04N 17/00* (2006.01)
(Continued)

(52) U.S. Cl.
CPC ....... *H04N 5/23206* (2013.01); *H04N 5/2258* (2013.01); *H04N 5/23225* (2013.01); *H04N 5/23238* (2013.01); *H04N 5/23241* (2013.01); *H04N 5/247* (2013.01); *H04N 5/265* (2013.01); *H04N 7/181* (2013.01); *H04N 17/002* (2013.01); *H04R 1/028* (2013.01); *H04R 3/00* (2013.01)

(58) Field of Classification Search
CPC ........................................ H04N 7/00
USPC ..................... 348/142–160, 36–39
See application file for complete search history.

(56) References Cited

U.S. PATENT DOCUMENTS 9,842,254 B1   12/2017  Brailovskiy et al.
2005/0141607 A1   6/2005  Kaplinsky
(Continued)

FOREIGN PATENT DOCUMENTS

EP   3 079 346 A2    10/2016
KR   10-0551826 B1    2/2006
(Continued)

OTHER PUBLICATIONS

Communication dated Aug. 16, 2019, issued by the European Patent Office in counterpart European Application No. 19163460.9.
(Continued)

*Primary Examiner* — Eileen M Adams
(74) *Attorney, Agent, or Firm* — Sughrue Mion, PLLC

(57) ABSTRACT

An image providing apparatus includes an internal communication interface configured to receive image data and camera setting information from a plurality of camera modules included in a network camera housing, and transmit a control signal to the plurality of camera modules; a processor configured to generate the control signal to control an operation of the plurality of camera modules, control a power supply to each of the plurality of camera modules, and generate combined image data by combining the image data obtained from the plurality of camera modules; and an external communication interface configured to transmit the combined image data to a client terminal via an Internet network.

17 Claims, 16 Drawing Sheets

(51) Int. Cl.
  *H04R 1/02* (2006.01)
  *H04R 3/00* (2006.01)
  *H04N 5/225* (2006.01)

(56) References Cited

U.S. PATENT DOCUMENTS

| | | | |
|---|---|---|---|
| 2007/0103543 A1* | 5/2007 | Anderson | H04N 5/2251 348/36 |
| 2010/0253792 A1* | 10/2010 | Kawaguchi | H04N 5/232 348/208.2 |
| 2014/0176790 A1* | 6/2014 | Shen | H04N 5/23241 348/372 |
| 2015/0348580 A1 | 12/2015 | van Hoff et al. | |
| 2016/0191815 A1 | 6/2016 | Annau et al. | |
| 2016/0277714 A1 | 9/2016 | Teachout | |
| 2017/0187955 A1 | 6/2017 | Fink et al. | |
| 2018/0160042 A1* | 6/2018 | He | H04N 5/23293 |

FOREIGN PATENT DOCUMENTS

| | | |
|---|---|---|
| KR | 10-2007-0058263 A | 6/2007 |
| KR | 10-0757887 B1 | 9/2007 |
| KR | 10-2011-0078655 A | 7/2011 |
| KR | 10-1682982 B1 | 12/2016 |

OTHER PUBLICATIONS

Communication dated Oct. 25, 2019, issued by the European Patent Office in counterpart European Application No. 19163460.9.

* cited by examiner

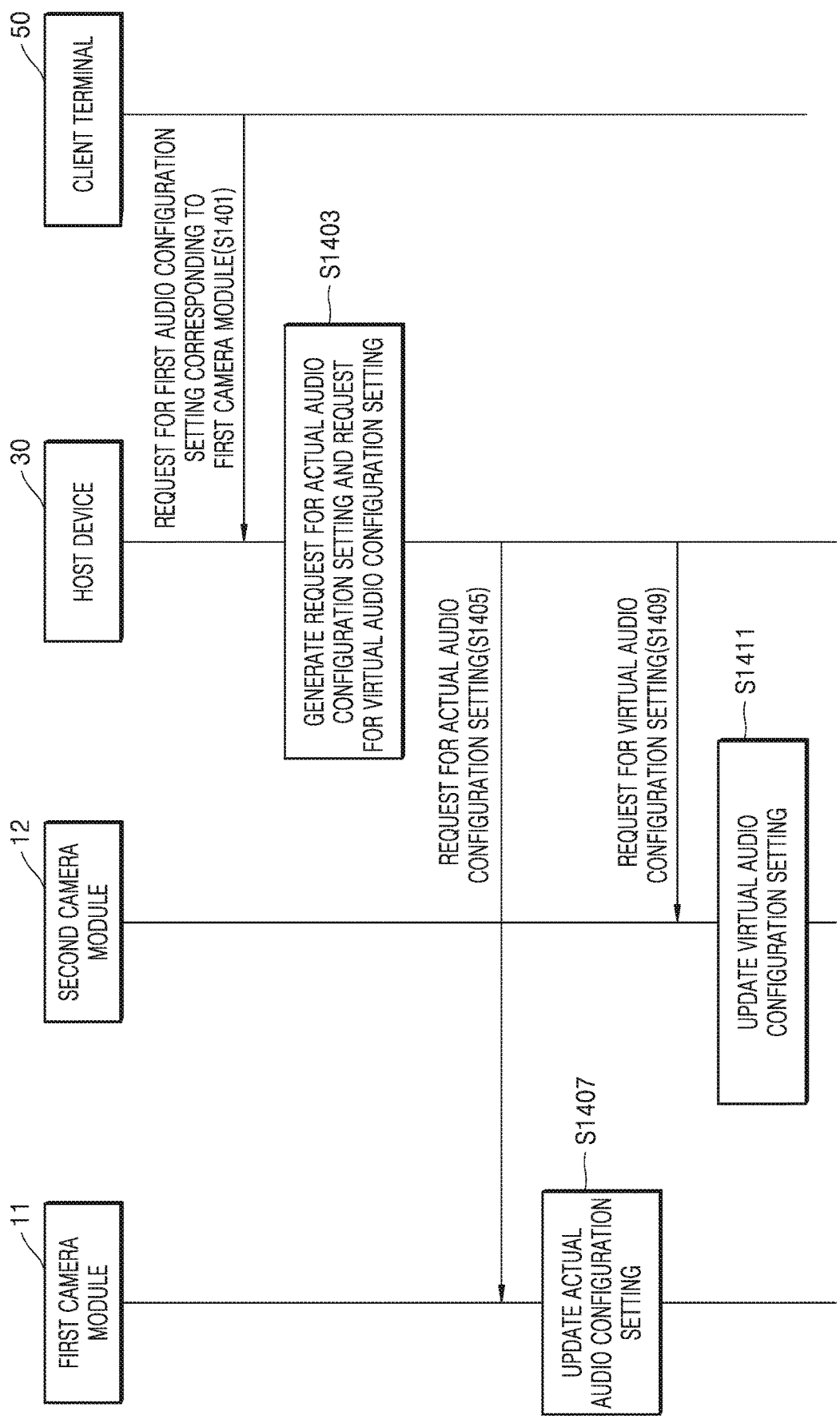

FIG. 15

| | FIRST CAMERA MODULE | SECOND CAMERA MODULE | THIRD CAMERA MODULE | FOURTH CAMERA MODULE |
|---|---|---|---|---|
| AUDIO SOURCE CONFIGURATION | FIRST AUDIO SOURCE CONFIGURATION | SECOND AUDIO SOURCE CONFIGURATION | THIRD AUDIO SOURCE CONFIGURATION | FOURTH AUDIO SOURCE CONFIGURATION |
| AUDIO ENCODER CONFIGURATION | FIRST AUDIO ENCODER CONFIGURATION | SECOND AUDIO ENCODER CONFIGURATION | THIRD AUDIO ENCODER CONFIGURATION | FOURTH AUDIO ENCODER CONFIGURATION |
| AUDIO OUTPUT CONFIGURATION | FIRST AUDIO OUTPUT CONFIGURATION | SECOND AUDIO OUTPUT CONFIGURATION | THIRD AUDIO OUTPUT CONFIGURATION | FOURTH AUDIO OUTPUT CONFIGURATION |

IMAGE PROVIDING APPARATUS AND METHOD

CROSS-REFERENCE TO THE RELATED APPLICATIONS

This application claims priority from Korean Patent Application Nos. 10-2018-0031121 and 10-2018-0055043, respectively filed on Mar. 16, 2018 and May 14, 2018, in the Korean Intellectual Property Office, the disclosures of which are incorporated herein by reference in their entireties.

BACKGROUND

1. Field

One or more embodiments relate to an image providing apparatus and method, which are for controlling the operation of a network camera including a plurality of camera modules.

2. Description of the Related Art

When a monitoring system provides images, which are received from a camera shooting a monitored area, through a screen, a controller may perceive the image with his/her eyes through a user interface and then adjust the rotation direction or the zoom ratio of the camera.

A monitoring system may simultaneously monitor a plurality of areas using a plurality of cameras and may also monitor an area in all directions using a camera including a plurality of image sensors.

SUMMARY

One or more embodiments include an image providing apparatus and method, which are for effectively controlling the operation of a network camera including a plurality of camera modules.

Additional aspects will be set forth in part in the description which follows and, in part, will be apparent from the description, or may be learned by practice of the presented embodiments.

According to an aspect of an embodiment, there is provided an image providing apparatus including: an internal communication interface configured to receive image data and camera setting information from a plurality of camera modules included in a network camera housing, and transmit a control signal to the plurality of camera modules; a processor configured to generate the control signal to control an operation of the plurality of camera modules, control a power supply to each of the plurality of camera modules, and generate combined image data by combining the image data obtained from the plurality of camera modules; and an external communication interface configured to transmit the combined image data to a client terminal based on an Internet Protocol (IP) address.

The processor may be further configured to control the power supply to each of the plurality of camera modules based on at least one of the image data and the camera setting information.

The processor may be further configured to recognize a current version of firmware of at least one camera module of the plurality of camera modules, based on the camera setting information, and generate a firmware upgrade control signal for the at least one camera module in response to the current version being different from a latest version, and the internal communication interface may be further configured to transmit the firmware upgrade control signal to the at least one camera module.

The external communication interface may be further configured to receive a user input for selecting a resolution from the client terminal. The processor may be further configured to generate the combined image data having the selected resolution by adjusting a resolution of each of the image data obtained from the plurality of camera modules and then combining the image data, or adjust a resolution of the combined image data to the selected resolution. The internal communication interface may be further configured to transmit the combined image data having the selected resolution to the client terminal.

The processor may be further configured to: determine whether the image data is normal based on the camera setting information, detect at least one camera module that produces an error in the image data, among the plurality of camera modules, and generate error information with respect to the at least one camera module. The error information may include identification information about the at least one camera module, and at least one of an operation stop signal, a power supply stop signal, and a rebooting signal. The internal communication interface may transmit the at least one of the operation stop signal, the power supply stop signal, and the rebooting signal to the at least one camera module. The external communication interface may transmit the identification information to the client terminal.

The processor may be further configured to extract a set frame rate or a set bitrate from the camera setting information, extract an actual frame rate or an actual bitrate from the image data, determine whether the actual frame rate is equal to the set frame rate or whether the actual bitrate is equal to the set bitrate; and detects a camera module, which has the actual frame rate different from the set frame rate or the actual bitrate different from the set bitrate, as the at least one camera module that produces the error is in the image data, among the plurality of camera modules.

The processor may be further configured to determine whether a dynamic frame rate setting or a dynamic bitrate setting has been activated based on the camera setting information and determine normality or abnormality of the image data in response to the dynamic frame rate setting or the dynamic bitrate setting being deactivated.

The internal communication interface may be further configured to receive camera state information from each of the plurality of camera modules. The processor may be further configured to extract actual central processing unit (CPU) usage from the camera state information, compare the actual CPU usage with reference CPU usage, detect at least one camera module of which the actual CPU usage exceeds the reference CPU usage, as having a CPU error, and generate error information with respect to the at least one camera module. The error information may include identification information about the at least one camera module, and at least one of an operation stop signal, a power supply stop signal, and a rebooting signal. The internal communication interface may be further configured to transmit the at least one of the operation stop signal, the power supply stop signal, and the rebooting signal to the at least one camera module. The external communication interface may be further configured to transmit the identification information to the client terminal.

The plurality of camera modules may include a first camera module and a second camera module. The first camera module may be connected to a microphone that generates first audio data, and the second camera module may not be connected to the microphone. The external communication interface may be further configured to receive, from the client terminal, a request for second audio data that requests the second camera module to obtain the second audio data through the microphone. The internal communication interface may be further configured to transmit a request for the first audio data to the first camera module and receive the first audio data from the first camera module, and the processor may be further configured to generate the second audio data including the first audio data in response to the request for the second audio data.

The external communication interface may be further configured to receive the request for the first audio data and transmit the first audio data to the client terminal. The internal communication interface may be further configured to transmit the request for the first audio data to the first camera module and receive, from the first camera module the first audio data that is generated from the microphone. The processor may be further configured to generate the first audio data in response to the request for the first audio data.

The plurality of camera modules may include a first camera module and a second camera module. The first camera module may be connected to a microphone that generates first audio data, and the second camera module may not be connected to the microphone. The external communication interface may be further configured to receive, from the client terminal, a request for second audio data that requests the second camera module to obtain the second audio data through the microphone. The internal communication interface may be further configured to transmit a request for the first audio data to the first camera module, receive the first audio data from the first camera module, and transmit the first audio data as the second audio data, to the second camera module, in response to the request for the second audio data.

The external communication interface may be further configured to receive the request for the first audio data from the client terminal, and the internal communication interface may be further configured to transmit the request for the first audio data to the first camera module.

The plurality of camera modules may include a first camera module and a second camera module. The first camera module may be connected to a microphone, and the second camera module may not be connected to the microphone. The external communication interface may be further configured to receive, from the client terminal, a request for a first audio configuration setting corresponding to the first camera module. The processor may be further configured to generate a request for an actual audio configuration setting and a request for a virtual audio configuration setting in response to the request for the first audio configuration setting. The internal communication interface may be further configured to transmit the request for the actual audio configuration setting to the first camera module and transmits the request for the virtual audio configuration setting to the second camera module.

The actual audio configuration setting may include at least one of an audio source configuration of the first camera module, an audio encoder configuration of the first camera module, and an audio output configuration of the first camera module.

The image providing apparatus may further include a microphone configured to obtain actual audio data. The external communication interface may be further configured to receive a request for predetermined audio data from the client terminal and transmit the predetermined audio data to the client terminal, wherein the predetermined audio data corresponds to a predetermined camera comprised in the plurality of camera modules. The processor may be further configured to generate the predetermined audio data including the actual audio data in response to the request for the predetermined audio data.

Each of the plurality of camera modules may include an image signal processor that is independent of the processor.

According to an aspect of another embodiment, there is provided an image providing method including: receiving, by an internal communication interface, image data and camera setting information from a plurality of camera modules included in a network camera housing; determining whether the image data is normal based on the camera setting information; detecting at least one camera module that produces an error in the image data, among the plurality of camera modules; generating identification information about the at least one camera module, and at least one of an operation stop signal and a power supply stop signal; transmitting the identification information to a client terminal via an Internet network, by an external communication module; and transmitting the at least one of the operation stop signal and the power supply stop signal to the at least one camera module, by the internal communication interface.

The image providing method may further include: determining that a dynamic bitrate setting and a dynamic frame rate setting are deactivated before performing an operation of the determining whether the image data is normal based on the camera setting information.

The detecting the at least one camera module that produces the error may further include: detecting the at least one camera module in response to a difference between an actual bit rate of the at least one camera module and a pre-set bit rate of the at least one camera module being greater than a threshold value.

The detecting the at least one camera module that produces the error may include: detecting the at least one camera module in response to a difference between an actual frame rate of the at least one camera module and a pre-set frame rate of the at least one camera module being greater than a threshold value.

BRIEF DESCRIPTION OF THE DRAWINGS

These and/or other aspects will become apparent and more readily appreciated from the following description of the embodiments, taken in conjunction with the accompanying drawings in which:

FIG. 14 is a flowchart for explaining an image providing method according to an embodiment;

FIG. 15 is a diagram for explaining the audio configurations of a plurality of camera modules, according to an embodiment;

DETAILED DESCRIPTION

Figure 1:
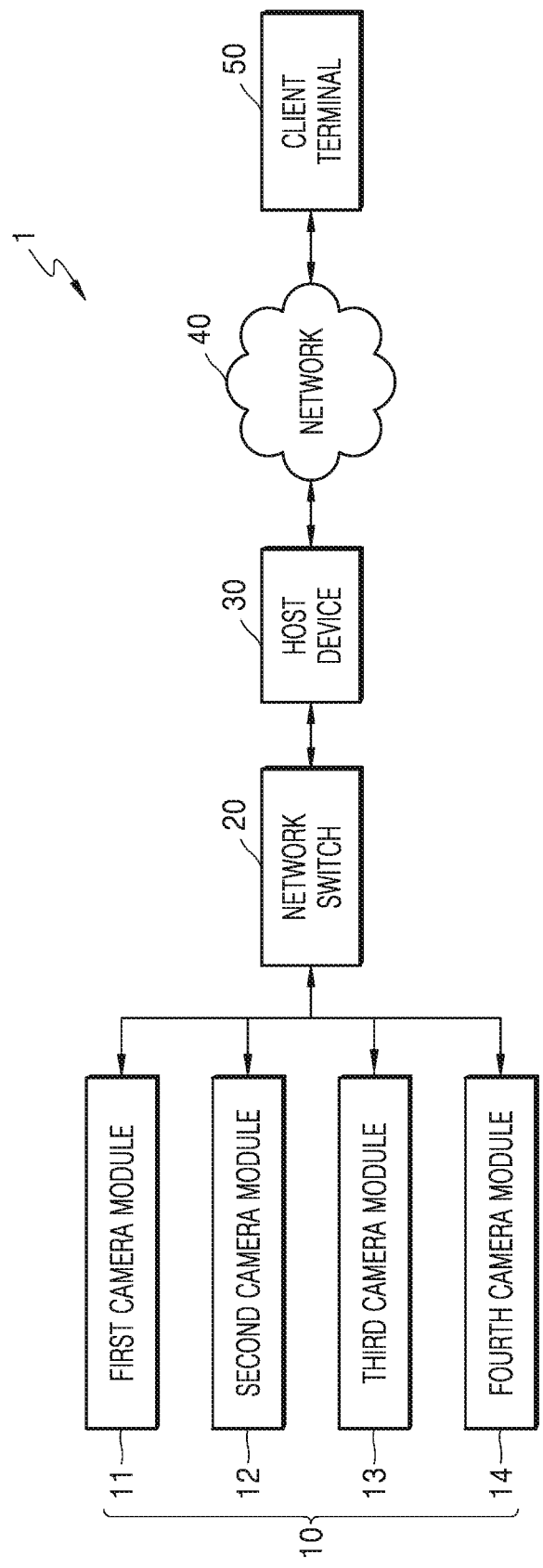
FIG. 1 is a diagram for explaining a monitoring system according to an embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list.

While such terms "first," "second," etc., may be used to describe various components, such components must not be limited to the above terms. The above terms are used only to distinguish one component from another.

The terms used in the present specification are merely used to describe example embodiments and are not intended to limit embodiments. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Embodiments may be described in terms of functional block components and various processing steps. Such functional blocks may be realized by any number of hardware and/or software components configured to perform the specified functions. For example, embodiments may employ various integrated circuit (IC) components, e.g., memory elements, processing elements, logic elements, look-up tables, and the like, which may carry out a variety of functions under the control of one or more microprocessors or other control devices. Similarly, where the elements of embodiments are implemented using software programming or software elements, embodiments may be implemented with any programming or scripting language such as C, C++, Java, assembler language, or the like, with the various algorithms being implemented with any combination of data structures, object, processes, routines or other programming elements. Functional aspects may be implemented in algorithms that are executed on one or more processors. Furthermore, embodiments could employ any number of conventional techniques for electronics configuration, signal processing and/or control, data processing and the like. The words "mechanism," "element," "means," and "configuration" are used broadly and are not limited to mechanical or physical embodiments, but can include software routines in conjunction with processors, etc.

FIG. 1 is a diagram for explaining a monitoring system 1 according to an embodiment.

Figure 2:
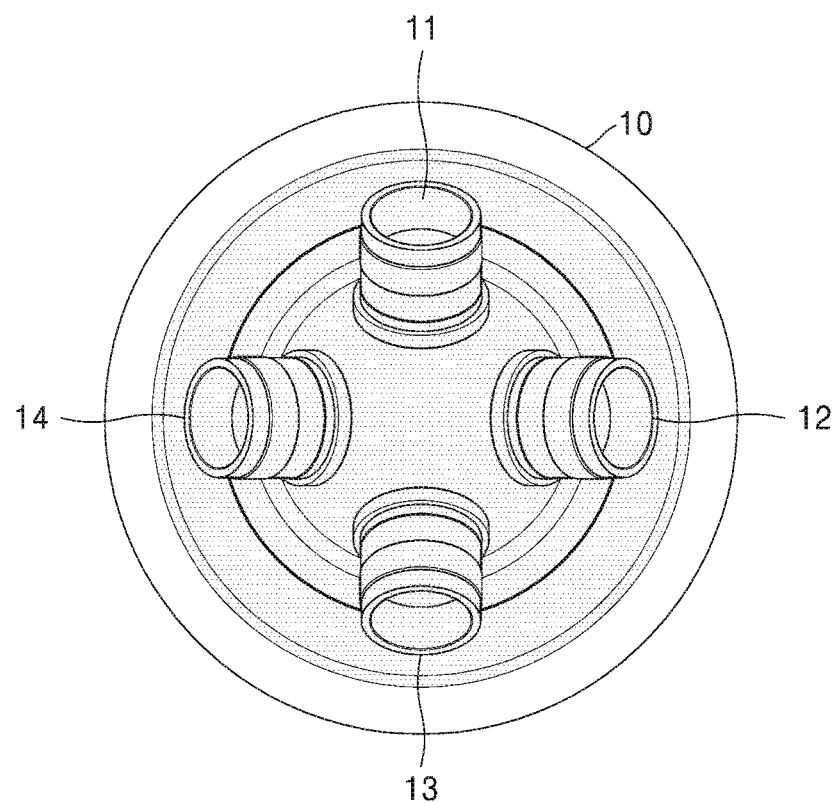
FIG. 2 is a diagram for explaining a network camera according to an embodiment.

FIG. 2 is a diagram for explaining a network camera 10 according to an embodiment.

Referring to FIGS. 1 and 2, the monitoring system 1 includes the network camera 10, a network switch 20, a host device 30, a network 40, and a client terminal 50.

According to an embodiment, the monitoring system 1 may provide a configuration allowing a user to monitor information transmitted to the client terminal 50 when the information about the network camera 10 is collected in the host device 30, and is transmitted from the host device 30 to the client terminal 50 via the network 40.

The network camera 10 may shoot a monitored area in real time for the purpose of surveillance or security. One or more network cameras 10 may be provided.

The network camera 10 shoots the monitored area and obtains image data of the monitored area.

The network camera 10 may include a plurality of camera modules. The plurality of camera modules may be included in a single network camera housing.

For example, first through fourth camera modules 11 through 14 may be provided in the network camera 10. The first through fourth camera modules 11 through 14 may simultaneously shoot the monitored area, in which the network camera 10 is installed, from different directions, respectively. Accordingly, the network camera 10 may obtain four different image data of the monitored area at a time.

Hereinafter, image data obtained by the first camera module 11 is referred to as first image data, image data obtained by the second camera module 12 is referred to as second image data, image data obtained by the third camera module 13 is referred to as third image data, and image data obtained by the fourth camera module 14 is referred to as fourth image data.

Meanwhile, each of the first through fourth camera modules 11 through 14 may include an image signal processor (ISP). For example, the first camera module 11 may encode the first image data and output first encoded image data. Similarly, the second camera module 12 may output second encoded image data, the third camera module 13 may output third encoded image data, and the fourth camera module 14 may output fourth encoded image data.

As described above, when each of the first through fourth camera modules 11 through 14 includes an ISP, the first through fourth image data may be processed to have a set frame rate or a set bitrate.

In a case where each of the first through fourth camera modules 11 through 14 includes an ISP, even when an error occurs in the first camera module 11, the second through fourth camera modules 12 through 14 operate normally. Accordingly, the monitored area may be monitored without a break.

The network camera 10 may obtain image data via an image sensor such as a charge-coupled device (CCD) sensor or a complementary metal-oxide-semiconductor (CMOS) sensor.

The image data may be real-time image data and/or recorded image data.

Meanwhile, the image data may be still image data and/or moving image data.

The network camera 10 may be a low-power camera powered by batteries.

The low-power camera usually remains in a sleep mode (or a power saving mode), and periodically wakes up to check whether an event occurs or wakes up upon receiving a notification signal indicating that an event occurs. The low-power camera enters an active mode when an event occurs and returns to the sleep mode when no events occur. As such, the low-power camera enters the active mode only when an event occurs, thereby reducing power consumption.

The network camera 10 may be a pan-tilt-zoom (PTZ) camera that is capable of panning and tilting and of controlling the zoom ratio of a lens.

The network camera 10 may encode image data and transmit an encoded result to the host device 30 via the network switch 20.

The network switch 20 provides a path for accessing the network camera 10.

The network switch 20 may provide an Internet Protocol (IP) address indicating an access path to the network camera 10. Accordingly, the first through fourth camera modules 11 through 14 may share one IP address. In other words, the network switch 20 may operate as an IP router. At this time, the client terminal 50 may obtain a plurality of pieces of image data, which have been shot by a plurality of camera modules, through a single IP address.

The network switch 20 transmits a plurality of pieces of image data from a plurality of camera modules 11-14 to the host device 30. At this time, the plurality of pieces of image data transmitted and received via the network switch 20 may have been respectively encoded by the plurality of camera modules 11-14.

For example, the network switch 20 may transmit the first through fourth encoded image data respectively received from the first through fourth camera modules 11 through 14 to the host device 30. At this time, the first through fourth encoded image data may be separated from one another without being combined.

The host device 30 receives the plurality of pieces of image data from the network switch 20 and transmits a piece of combined image data, into which the plurality of pieces of image data are combined, to the client terminal 50 at a user's request.

The host device 30 may include an ISP separated from an ISP included in each of the first through fourth camera modules 11 through 14. The ISP included in the host device 30 may generate a piece of combined image data into which a plurality of pieces of image data are combined.

For example, the host device 30 may decode the first through fourth encoded image data received from the network switch 20, scale first through fourth decoded image data, generate a piece of combined image data by combining first through fourth scaled image data, encode the combined image data, and transmit an encoded combined image data to the client terminal 50.

When the host device 30 senses an operational error that has occurred in the host device 30 itself, the host device 30 selects one of a plurality of camera modules 11-14 as a master device and authorizes the master device to perform the operation of the host device 30.

For example, when the host device 30 determines that the operation of the host device 30 is impossible because of overload or external attacks, the host device 30 may select the first camera module 11 as a mater device and transfer authority to provide a piece of combined image data to the first camera module 11.

After the host device 30 transfers the authority to provide a piece of combined image data to the first camera module 11, the host device 30 may autonomously reboot on its own. When the host device 30 successfully reboots, the host device 30 may perform a function of providing a path for accessing the network camera 10 together with the network switch 20.

According to the current embodiment, even when an error occurs in the operation of the host device 30, image data of the network camera 10 may be normally provided to the client terminal 50, so that the monitoring system 1 is robust to errors.

The network switch 20 and the host device 30 may be part of the network camera 10. For example, the network switch 20 and the host device 30 may be included in a single network camera housing together with a plurality of camera modules. At this time, an ISP included in the host device 30 may be provided in the network camera 10 separately from an ISP included in each of the plurality of camera modules.

The network 40 may include a wired network or a wireless network. The wireless network may be a second generation (2G) or third generation (3G) cellular communication system, a 3G partnership project (3GPP) network, a fourth generation (4G) communication system, a long-term evolution (LTE) network, a world interoperability for microwave access (WiMAX) network, or the like. The client terminal 50 may exchange data with the host device 30 via the network 40.

The client terminal 50 may communicate with the host device 30 based on a single IP address.

The client terminal 50 may display or store image data transmitted from the host device 30. The client terminal 50 may receive a user input and transmit the user input to the host device 30.

The client terminal 50 may include at least one processor. The client terminal 50 may be included in another hardware device such as a microprocessor or a general-purpose computer system. The client terminal 50 may be a personal computer or a mobile terminal.

Figure 3:
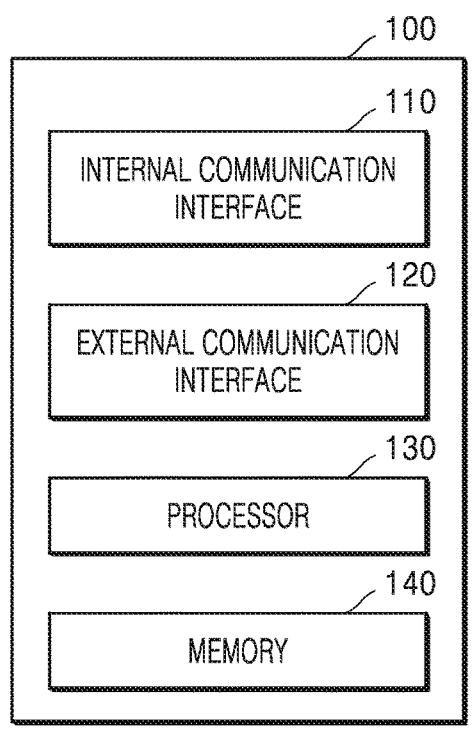
FIG. 3 is a block diagram of the configuration of an image providing apparatus according to an embodiment.

FIG. 3 is a block diagram of the configuration of an image providing apparatus 100 according to an embodiment.

According to an embodiment, the image providing apparatus 100 may be implemented as a single physical apparatus or by organically combining a plurality of physical apparatuses.

For this, some of elements included in the image providing apparatus 100 may be implemented or installed in one physical apparatus and the other elements may be implemented or installed in another physical apparatus. At this time, the one physical apparatus may be implemented as part of the network switch 20 and the other physical apparatus may be implemented as part of the host device 30.

According to an embodiment, the image providing apparatus 100 may be embedded in the network switch 20, the host device 30, or the client terminal 50 or may be applied to an apparatus separated from the network switch 20, the host device 30, and the client terminal 50.

Hereinafter, the configuration of the image providing apparatus 100 included in the host device 30 will be described in detail. The configuration may also be applied to the image providing apparatus 100 included in the network switch 20 or the client terminal 50.

Referring to FIG. 3, the image providing apparatus 100 includes an internal communication interface 110, an external communication interface 120, a processor 130, and a memory 140. The internal communication interface 110 may include a data bus, a memory bus, a system bus, and may connect all the internal components of the image providing apparatus 100.

The internal communication interface 110 communicates with each of a plurality of camera modules 11-14 included in the network camera 10.

The internal communication interface 110 may receive image data, camera setting information, camera state information, etc. from each of the plurality of camera modules 11-14.

Hereinafter, camera setting information about the first camera module 11 is referred to as first camera setting information, camera setting information about the second camera module 12 is referred to as second camera setting information, camera setting information about the third camera module 13 is referred to as third camera setting information, and camera setting information about the fourth camera module 14 is referred to as fourth camera setting information.

Hereinafter, camera state information about the first camera module 11 is referred to as first camera state information, camera state information about the second camera module 12 is referred to as second camera state information, camera state information about the third camera module 13 is referred to as third camera state information, and camera state information about the fourth camera module 14 is referred to as fourth camera state information.

The internal communication interface 110 may receive image data, which corresponds to a result of encoding performed in each of the plurality of camera modules 11-14, from the network switch 20. For example, the internal communication interface 110 may receive first through fourth encoded image data.

Camera setting information may include a set value related to shooting of a camera module. For example, the camera setting information may include a set frame rate (e.g., 30 frame per second (FPS), 15 FPS, 5 FPS, 1 FPS, etc.), a set bitrate (e.g., 5 Mbps, 2 Mbps, etc.), a resolution (e.g., 520 TVL, 2 megapixels, 8 megapixels), a type of video compression (e.g., MPEG-2, MPEG-4, H.264, HEVC), etc.

Camera state information may refer to state information about hardware or the like, which forms a camera module. For example, the camera state information may include actual central processing unit (CPU) usage, actual memory usage, etc.

The internal communication interface 110 may transmit control signals to each of a plurality of camera modules 11-14. The control signals may include a firmware upgrade control signal, an operation stop signal, a power supply stop signal, a rebooting signal, etc.

The firmware upgrade control signal may enable a camera module to upgrade a firmware installed in the camera module to the latest version and may include the latest version of the firmware itself or an address of a location, in which the latest version of the firmware is stored, but is not limited thereto.

The operation stop signal may be used to stop the operation of a camera module. For example, the operation stop signal may be used to stop an operation related to shooting of the camera module.

The power supply stop signal may be for cutting off power supplied to a camera module.

The rebooting signal may be for rebooting a camera module.

The external communication interface 120 communicates with the client terminal 50 based on a single IP address.

The external communication interface 120 may transmit a piece of combined image data, error information, etc. to the client terminal 50.

The combined image data may be a result of combining a plurality of pieces of image data obtained by a plurality of camera modules.

The error information may include identification information about a camera module, an operation stop signal, a power supply stop signal, a rebooting signal, etc.

The external communication interface 120 may receive a user input for selecting a predefined resolution from the client terminal 50.

The processor 130 controls the operation of each of a plurality of camera modules, controls power supply to each camera module, and generates a piece of combined image data based on a plurality of pieces of image data obtained by the plurality of camera modules.

The processor 130 may recognize a current version of firmware, which is installed in each of a plurality of camera modules, based on camera setting information and may generate a firmware upgrade control signal for at least one camera module, in which the current version is different from the latest version.

The processor 130 may control power supply to each of a plurality of camera modules based on at least one of image data and camera setting information.

The processor 130 may control the resolution of each of a plurality of pieces of image data to generate a piece of combined image data having a predefined resolution or adjust a piece of combined image data, which is obtained by combining a plurality of pieces of image data, to a predefined resolution.

For example, the processor 130 may decode first through fourth encoded image data received from the first through fourth camera modules 11 through 14 and scale first through fourth decoded image data. The first through fourth encoded image data may each have a resolution of 2 megapixels. In particular, when a user input for selecting a resolution of 2 megapixels is received by the external communication interface 120, the processor 130 may scale down the first through fourth decoded image data such that each of the first through fourth decoded image data has a resolution of 0.5 megapixels. The processor 130 may combine the first through fourth decoded image data each having a resolution of 0.5 megapixels, thereby generating a piece of combined image data having a resolution of 2 megapixels.

For this, the processor 130 may include a decoder, a scaler, a multiplexer, an encoder, etc. The decoder may decode first through fourth encoded image data. The scaler may scale first through fourth decoded image data. The multiplexer may combine first through fourth scaled image data, thereby generating a piece of combined image data. The encoder may encode the combined image data.

The processor 130 may determine whether image data is normal based on camera setting information, detect at least one camera module with respect to which an error is detected in the image data, and generate error information with respect to the at least one camera module.

The processor 130 may check whether a dynamic frame rate setting or a dynamic bitrate setting has been activated based on camera setting information and determine normality or abnormality of image data of a camera module, in which the dynamic frame rate setting or the dynamic bitrate setting has not been activated. The processor 130 may omit to determine normality or abnormality of image data of a camera module in which the dynamic frame rate setting or the dynamic bitrate setting has been activated.

The processor 130 may extract a set frame rate or a set bitrate from camera setting information, extract an actual frame rate or an actual bitrate from image data, determine whether the actual frame rate is the same as the set frame rate or the actual bitrate is the same as the set bitrate, and detect a camera module, with respect to which the set frame rate is different from the actual frame rate or the set bitrate is different from the actual bitrate, as at least one camera module having an image data error. The processor 130 may also determine whether an actual resolution and an actual video compression rate are different from a set resolution and a set video compression rate, respectively, to detect an image data error.

Meanwhile, even though an actual frame rate is different from a set frame rate or an actual bitrate is different from a set bitrate with respect to a camera module, when the dynamic frame rate setting or the dynamic bitrate setting has been activated in the camera module, the processor 130 may not detect the camera module as at least one camera module having an image data error.

In addition, when a difference between the actual frame rate and the set frame rate and/or a difference between the actual bitrate and the set bitrate are less than a threshold value, the processor 130 may determine that the camera module is not producing errors.

The processor 130 may extract actual CPU usage from camera state information, compare the actual CPU usage with reference CPU usage, detect a camera module of which the actual CPU usage exceeds the reference CPU usage, as at least one camera module having a CPU error, and generate error information with respect to the at least one camera module.

The processor 130 may extract actual memory usage from camera state information, compare the actual memory usage with reference memory usage, detect a camera module of which the actual memory usage exceeds the reference memory usage, as at least one camera module having a memory error, and generate error information with respect to the at least one camera module.

The processor 130 may stop the operation of the at least one camera module having an error or stop power supply to the at least one camera module having an error, thereby increasing the accuracy of the monitoring system 1.

The processor 130 may reboot the at least one camera module having an error, so that the monitoring system 1 may automatically detect and correct an error.

The processor 130 may compare an incoming bandwidth of the host device 30 with an outgoing bandwidth of the host device 30 to detect an error in the host device 30. The incoming bandwidth and the outgoing bandwidth may be a bandwidth between the network camera 10 and the host device 30.

When an error is detected in the host device 30, the processor 130 may select one of a plurality of camera modules as a master device. The camera module selected as the master device may perform the functions of the image providing apparatus 100.

For example, the processor 130 may select the first camera module 11 from the first through fourth camera modules 11 through 14 as the master device in response to an error in the host device 30.

At this time, the processor 130 may select a camera module, which is given first priority or has the least load among a plurality of camera modules, as the master device.

A camera module, which has the least load among a plurality of camera modules, may be a camera module that has the least load at the time when an error is detected in the host device 30 or may be a camera module that has the least load during a predefined time period, but it is not limited thereto.

The memory 140 may store image data, camera setting information, camera state information, the latest version of firmware, an address of a location in which the latest version of firmware is stored, combined image data, history information regarding an error of a camera module, reference CPU usage, reference memory usage, etc., but what the memory 140 stores is not limited thereto.

Figure 4:
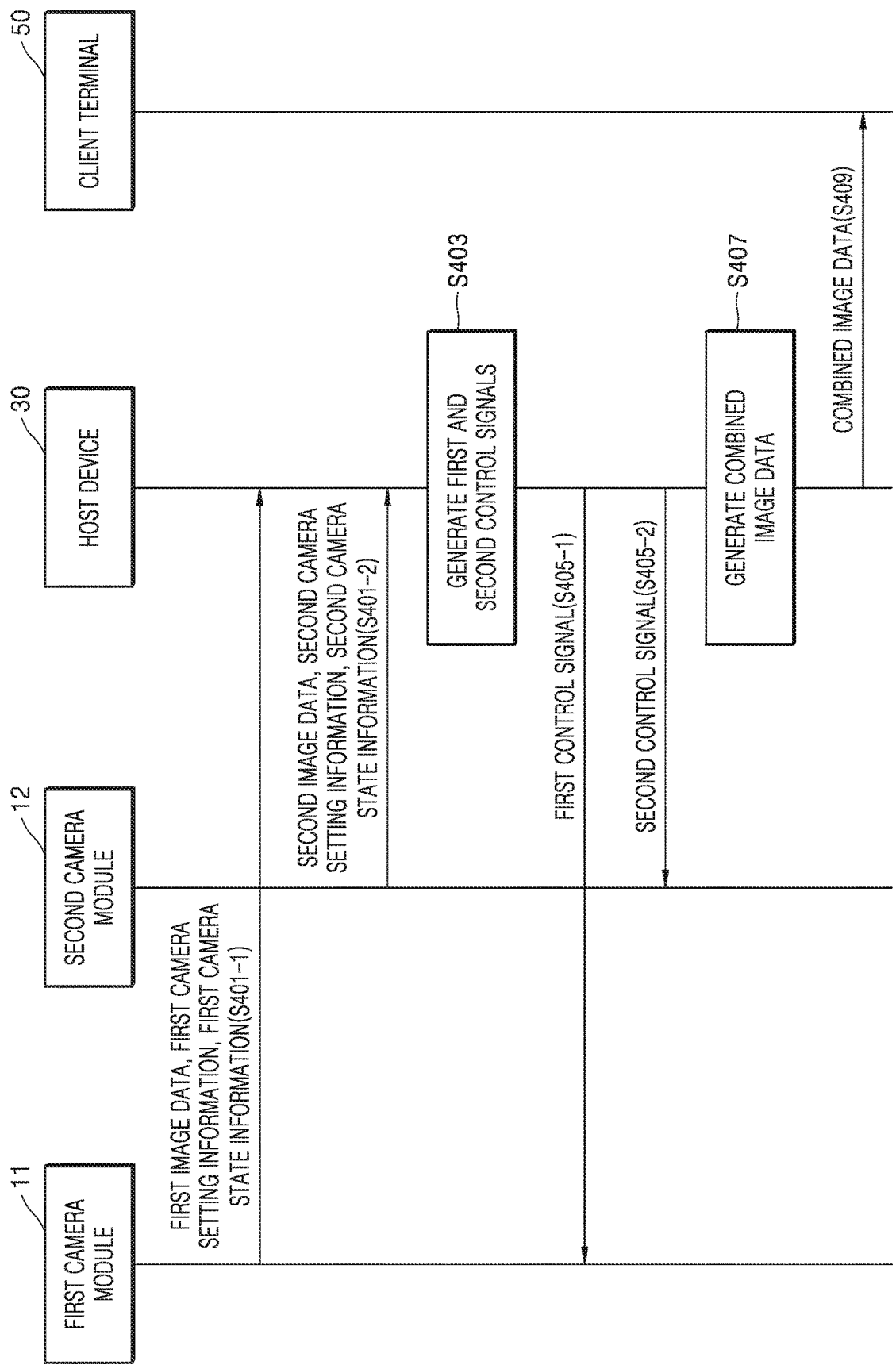
FIG. 4 is a flowchart for explaining an image providing method according to an embodiment.

FIG. 4 is a flowchart for explaining an image providing method according to an example embodiment.

Referring to FIG. 4, the internal communication interface 110 of the host device 30 receives at least one of first image data, first camera setting information, and first camera state information from the first camera module 11 in operation S401-1.

The internal communication interface 110 of the host device 30 receives at least one of second image data, second camera setting information, and second camera state information from the second camera module 12 in operation S401-2.

The processor 130 of the host device 30 generates a first control signal for the first camera module 11 based on the at least one of the first image data, the first camera setting information, and the first camera state information and a second control signal for the second camera module 12 based on the at least one of the second image data, the second camera setting information, and the second camera state information in operation S403.

The first and second control signals may be operation control signals or power supply control signals for the first and second camera modules 11 and 12, respectively, but are not limited thereto.

Thereafter, the internal communication interface 110 of the host device 30 transmits the first control signal to the first camera module 11 in operation S405-1 and transmits the second control signal to the second camera module 12 in operation S405-2.

Meanwhile, the processor 130 of the host device 30 generates a piece of combined image data based on the first and second image data, which are respectively obtained by the first and second camera modules 11 and 12, in operation S407.

At this time, the processor 130 may scale the first image data and the second image data and combine first scaled image data with second scaled image data, thereby generating the combined image data that has a resolution required in the client terminal 50.

Thereafter, the external communication interface 120 of the host device 30 transmits the combined image data to the client terminal 50 in operation S409.

According to the current embodiment, the monitoring system 1 that efficiently processes high-resolution image data without using separate expensive hardware may be provided.

Figure 5:
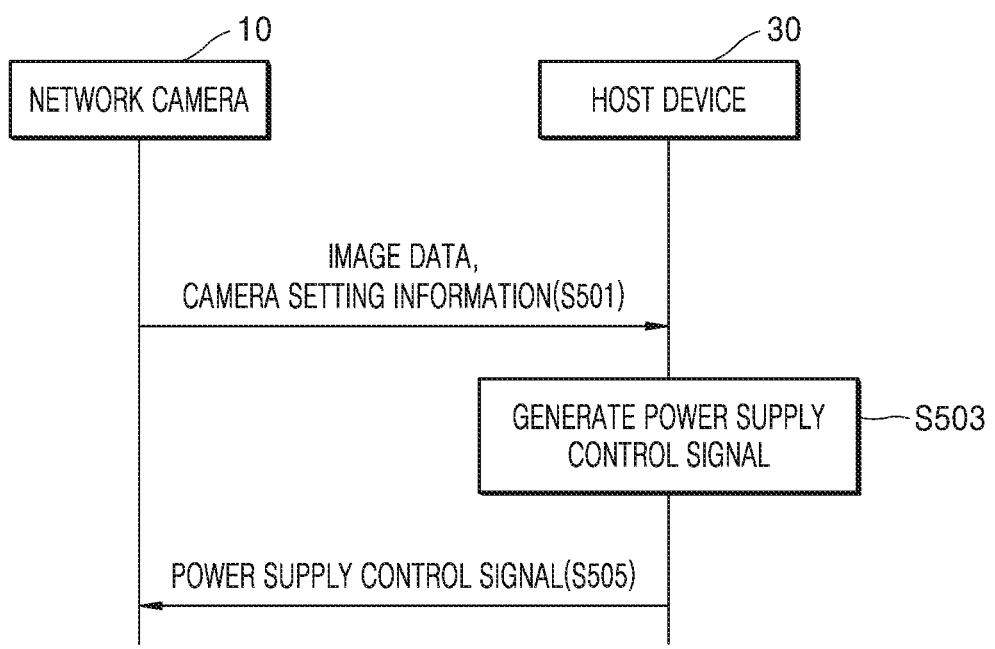
FIG. 5 is a flowchart for explaining an image providing method according to an embodiment.

FIG. 5 is a flowchart for explaining an image providing method according to an example embodiment.

Referring to FIG. 5, the internal communication interface 110 of the host device 30 receives at least one of image data and camera setting information from each of a plurality of camera modules included in the network camera 10 in operation S501.

For example, the internal communication interface 110 may receive at least one of first image data and first camera setting information from the first camera module 11, at least one of second image data and second camera setting information from the second camera module 12, at least one of third image data and third camera setting information from the third camera module 13, and at least one of fourth image data and fourth camera setting information from the fourth camera module 14.

Thereafter, the processor 130 of the host device 30 generates a power supply control signal for each of the plurality of camera modules based on the at least one of the image data and the camera setting information in operation S503.

For example, the processor 130 may generate a power supply stop signal for a camera module that does not transmit image data during a predefined time period.

For example, the processor 130 may generate a power supply stop signal for a camera module in which a set frame rate and/or a set bitrate is beyond a predefined range.

For example, the processor 130 may generate a power supply stop signal for a camera module of which the actual CPU usage and/or the actual memory usage is beyond a predefined range.

Thereafter, the internal communication interface 110 of the host device 30 transmits the power supply control signal to each of the plurality of camera modules included in the network camera 10 in operation S505.

The internal communication interface 110 may transmit the power supply control signal to only a camera module for which power supply needs to be controlled.

According to the current embodiment, the host device 30 controls power supply for each of a plurality of camera modules, so that the monitoring system 1 capable of continuously monitoring a monitored area may be provided.

Figure 6:
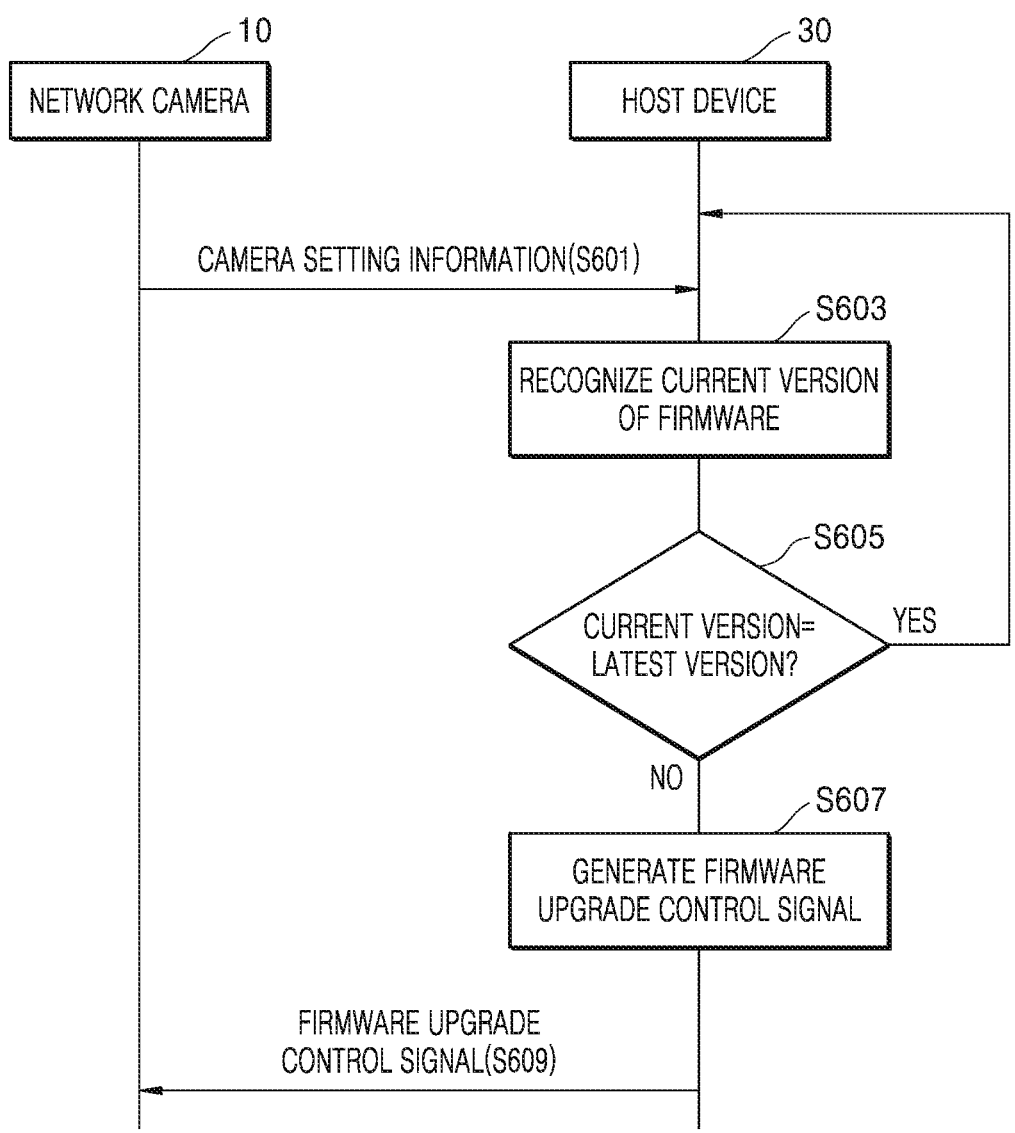
FIG. 6 is a flowchart for explaining an image providing method according to an embodiment.

FIG. 6 is a flowchart for explaining an image providing method according to an example embodiment.

The internal communication interface 110 of the host device 30 receives camera setting information from each of a plurality of camera modules included in the network camera 10 in operation S601.

For example, the internal communication interface 110 may receive first state information through fourth state information from the first through fourth camera modules 11 through 14, respectively.

The processor 130 of the host device 30 recognizes a current version of firmware, which is installed in each of the plurality of camera modules, based on the camera setting information in operation S603.

For example, the processor 130 may recognize a current version of firmware, which is installed in each of the first through fourth camera modules 11 through 14, based on the first state information through the fourth state information.

Thereafter, the processor 130 compares the current version of the firmware, which is installed in each of the plurality of camera modules, with the latest version in operation S605.

When the current version is different from the latest version in operation S605, the processor 130 generates a firmware upgrade control signal for at least one camera module, in which the current version is different from the latest version, in operation S607.

For example, when the current version of the firmware installed in the first camera module 11 is different from the latest version, the processor 130 may generate a firmware upgrade control signal for the first camera module 11.

When the current version is the same as the latest version in operation S605, the processor 130 may not generate a firmware upgrade control signal until receiving next camera setting information.

For example, when the current version of the firmware installed in each of the second through fourth camera modules 12 through 14 is the same as the latest version, the processor 130 may not generate a firmware upgrade control signal for any one of the second through fourth camera modules 12 through 14.

The internal communication interface 110 of the host device 30 transmits the firmware upgrade control signal to each of the plurality of camera modules included in the network camera 10 in operation S609.

The internal communication interface 110 may transmit the firmware upgrade control signal to only at least one camera module in which the current version of the firmware is different from the latest version.

According to the current embodiment, the host device 30 performs firmware upgrade control on each of a plurality of camera modules, so that the monitoring system 1 is capable of continuously monitoring a monitored area using some camera modules even when other camera modules stop operating.

If the first camera module 11 is in the firmware upgrade process and is not able to capture a video during the firmware upgrade process, the monitoring system 1 may monitor the area using the second to fourth camera modules 12-14. The second camera module 12 and the fourth camera module 14 may have view angles that (partially) overlap with the view angle of the first camera module 11, and the combination of a part of an image captured by the second camera module 12 and a part of an image captured by the fourth camera module 14 may cover the view angle of the first camera module 11.

Figure 7:
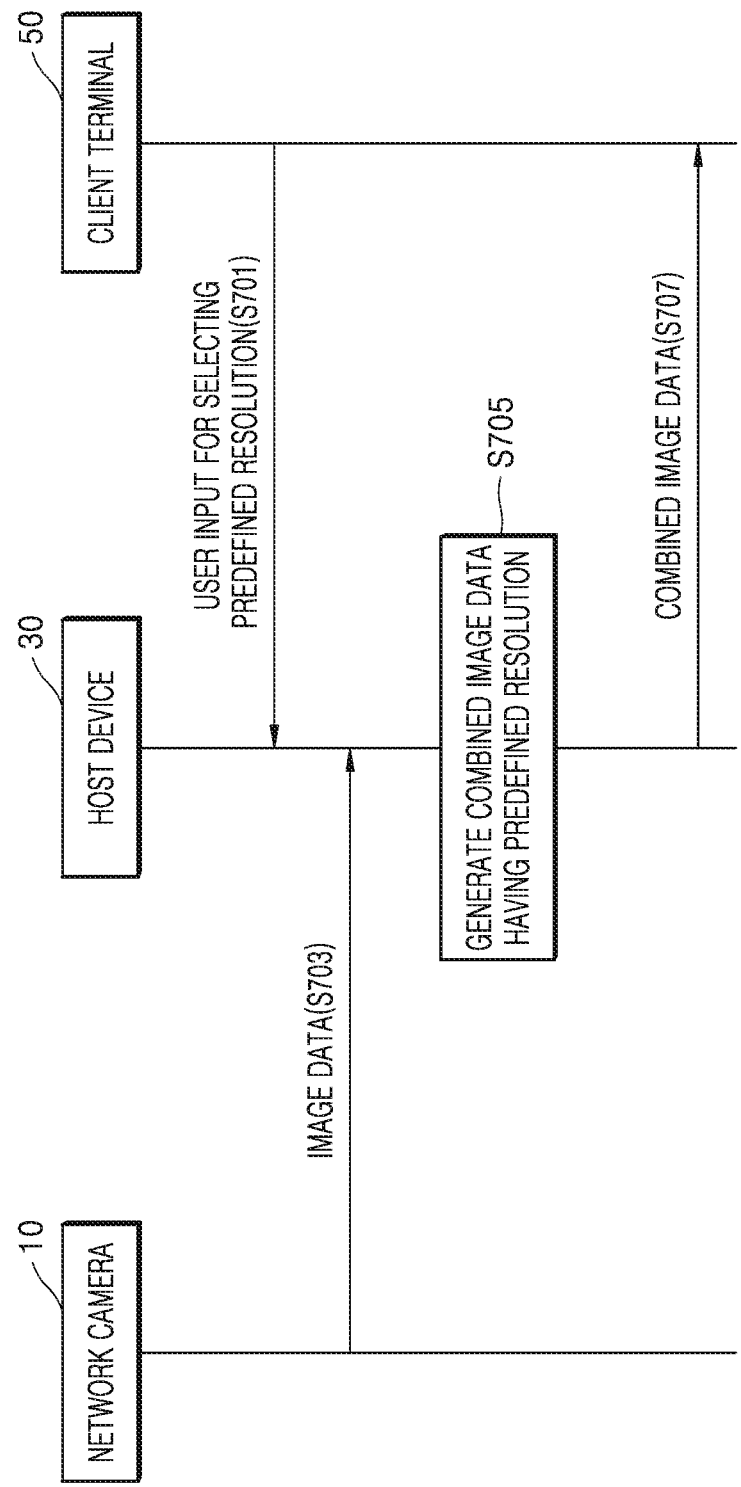
FIG. 7 is a flowchart for explaining an image providing method according to an embodiment.

FIG. 7 is a flowchart for explaining an image providing method according to an example embodiment.

Referring to FIG. 7, the external communication interface 120 of the host device 30 receives a user input for selecting a predefined resolution from the client terminal 50 in operation S701.

For example, the external communication interface 120 may receive a user input for selecting a resolution of 2 megapixels from the client terminal 50.

Thereafter, the internal communication interface 110 of the host device 30 receives image data from each of a plurality of camera modules included in the network camera 10 in operation S703.

For example, the internal communication interface 110 may receive first through fourth image data respectively from the first through fourth camera modules 11 through 14. In particular, each of the first through fourth image data may have a resolution of 2 megapixels.

Thereafter, the processor 130 of the host device 30 generates combined image data having a predefined resolution by combining a plurality of pieces of image data respectively received from the plurality of camera modules included in the network camera 10 in operation S705.

The processor 130 may generate the combined image data having a predefined resolution by adjusting the resolution of each of the plurality of pieces of image data and then combining the pieces of image data. For example, the processor 130 may scale down the first through fourth image data such that each of the first through fourth image data has a resolution of 0.5 megapixels and then combine first through fourth scaled image data, thereby generating a piece of combined image data having a resolution of 2 megapixels.

The processor 130 may adjust a resolution of a combined image data obtained by combining a plurality of pieces of image data to a predefined resolution. For example, the processor 130 may generate the combined image data by combining the first through fourth image data and then scale the combined image data such that the combined image data has a resolution of 2 megapixels.

The external communication interface 120 of the host device 30 transmits the combined image data having the predefined resolution to the client terminal 50 in operation S707.

According to the current embodiment, the monitoring system 1 that is capable of efficiently processing high-resolution image data may be provided.

Figure 8:
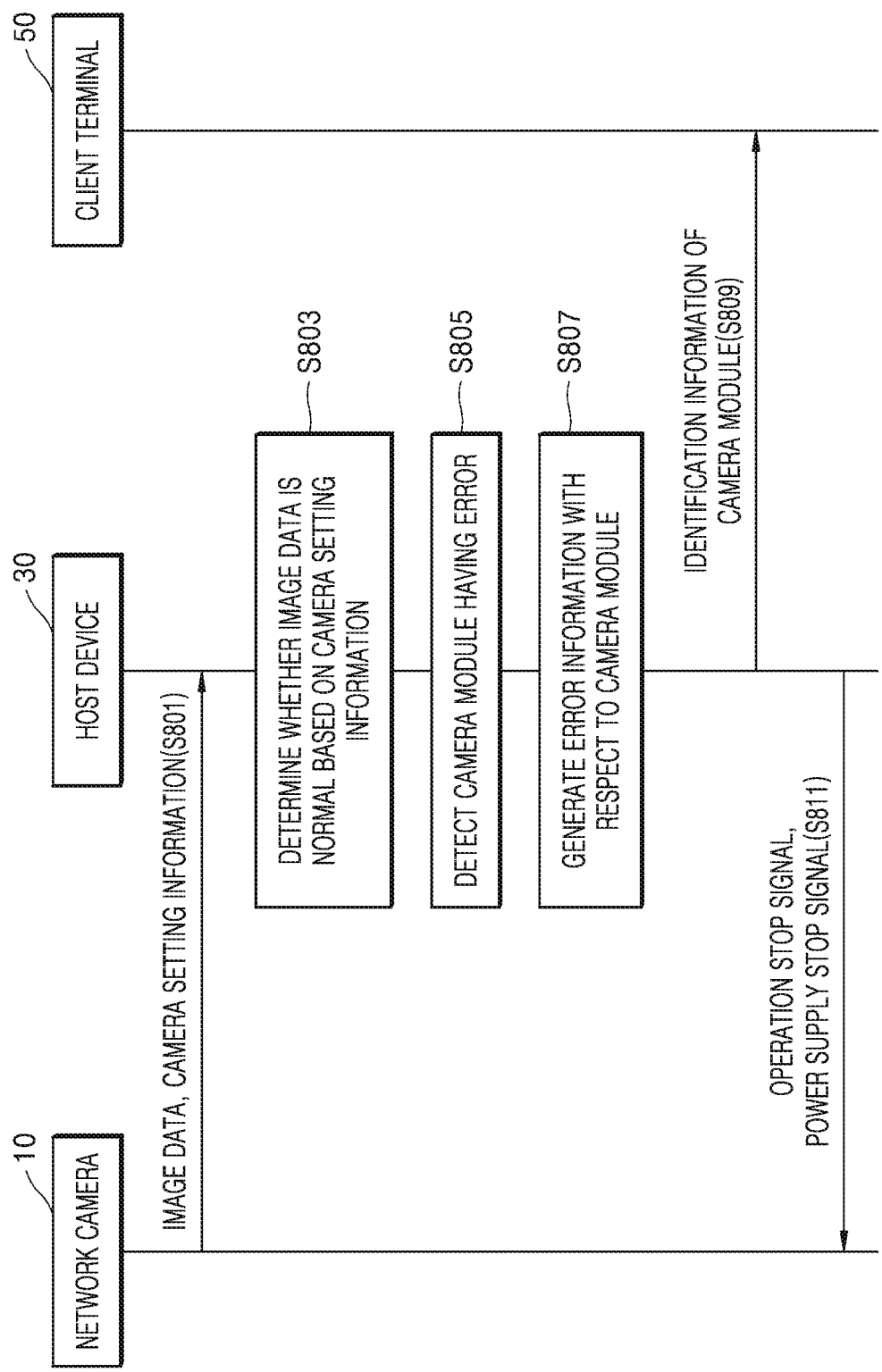
FIG. 8 is a flowchart for explaining an image providing method according to an embodiment.

FIG. 8 is a flowchart for explaining an image providing method according to an example embodiment.

Figure 9:
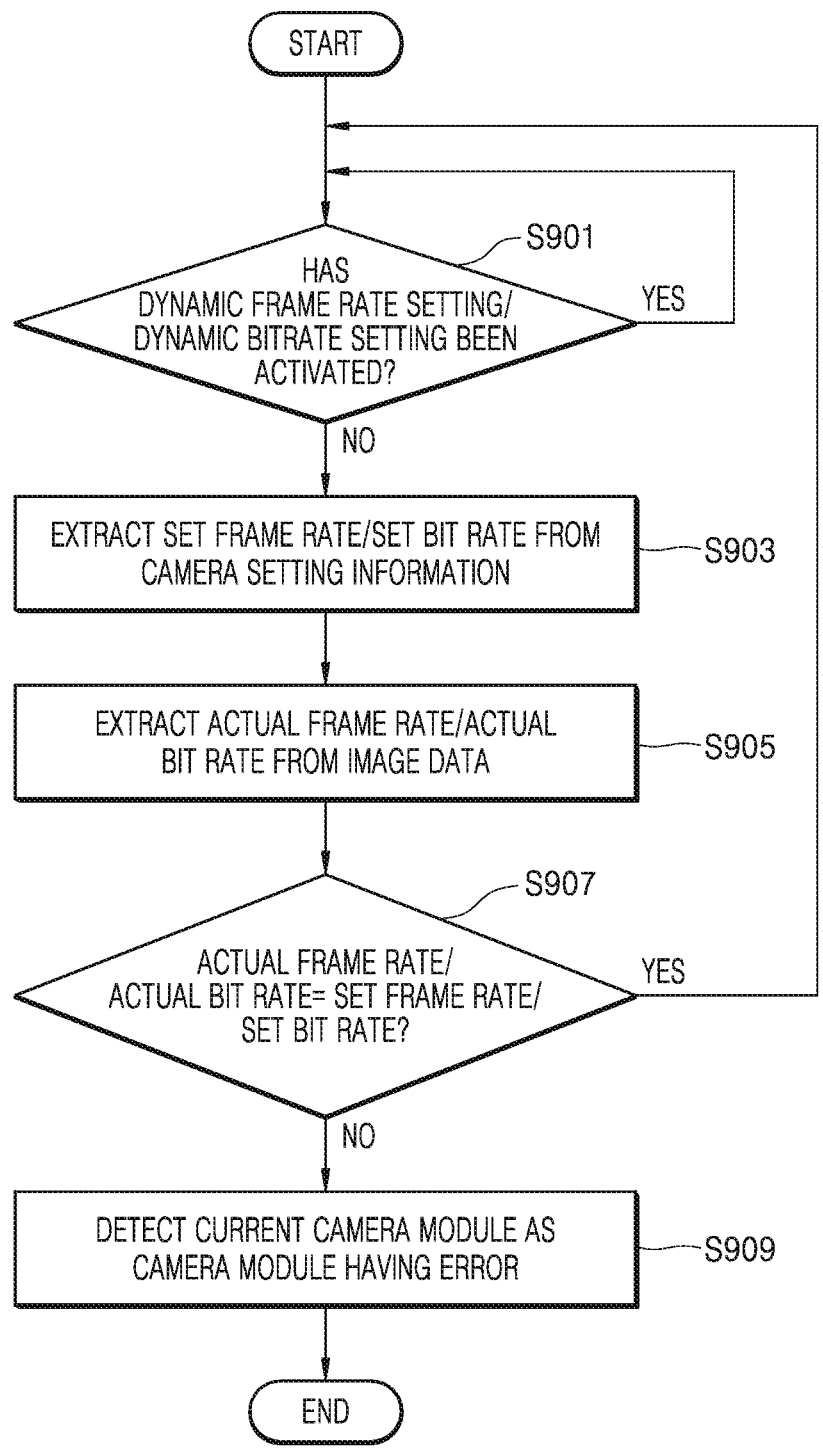
FIG. 9 is a flowchart for explaining an image providing method according to an embodiment.

FIG. 9 is a flowchart for explaining an image providing method according to an example embodiment.

Referring to FIG. 8, the internal communication interface 110 of the host device 30 receives at least one of image data and camera setting information from each of a plurality of camera modules included in the network camera 10 in operation S801.

For example, the internal communication interface 110 may receive at least one of first image data and first camera setting information from the first camera module 11, at least one of second image data and second camera setting information from the second camera module 12, at least one of third image data and third camera setting information from the third camera module 13, and at least one of fourth image data and fourth camera setting information from the fourth camera module 14.

The processor 130 of the host device 30 determines whether the image data is normal based on the camera setting information in operation S803 and detects a camera module, with respect to which an error is detected, in operation S805.

Referring to FIG. 9, the processor 130 determines whether a dynamic frame rate setting or a dynamic bitrate setting has been activated based on the camera setting information in operation S901.

The processor 130 extracts a set frame rate or a set bitrate from the camera setting information about a camera module, in which the dynamic frame rate setting or the dynamic bitrate setting has not been activated, in operation S903.

The processor 130 extracts an actual frame rate or an actual bitrate from the image data of the camera module, in which the dynamic frame rate setting or the dynamic bitrate setting has not been activated, in operation S905.

Thereafter, the processor 130 determines whether the actual frame rate is the same as the set frame rate or the actual bitrate is the same as the set bitrate in operation S907. In an example embodiment, the processor 130 may determine that the actual frame rate/bitrate is the same as the set frame rate/bitrate when the actual frame rate/bitrate is within a predetermined range of the set frame rate/bitrate (e.g., the set frame rate/bitrate$-\alpha \leq$the actual frame rate/bitrate$\leq$the set frame rate/bitrate$+\beta$, wherein $\alpha$ and $\beta$ are predetermined positive numbers).

The processor 130 detects at least one camera module, with respect to which the actual frame rate is different from the set frame rate or the actual bitrate is different from the set bitrate, as at least one camera module, with respect to which an image data error is detected, in operation S909.

According to the current embodiment, a camera module in which an error occurs may be accurately identified among a plurality of camera modules included in the network camera 10, so that the monitoring system 1 is capable of quickly dealing with errors.

Referring back to FIG. 8, the processor 130 generates error information with respect to the camera module, which is detected in operation S805, in operation S807. The error information may include at least one of identification information about the camera module detected in operation S805, an operation stop signal, and a power supply stop signal.

Thereafter, the external communication interface 120 of the host device 30 transmits the identification information about the camera module, which is detected in operation S805, to the client terminal 50 in operation S809.

The internal communication interface 110 of the host device 30 transmits at least one of an operation stop signal, a power supply stop signal, and a rebooting signal to the network camera 10 in operation S811. In particular, the internal communication interface 110 may transmit at least one of the operation stop signal and the power supply stop signal to the camera module, which is detected in operation S805.

Figure 10:
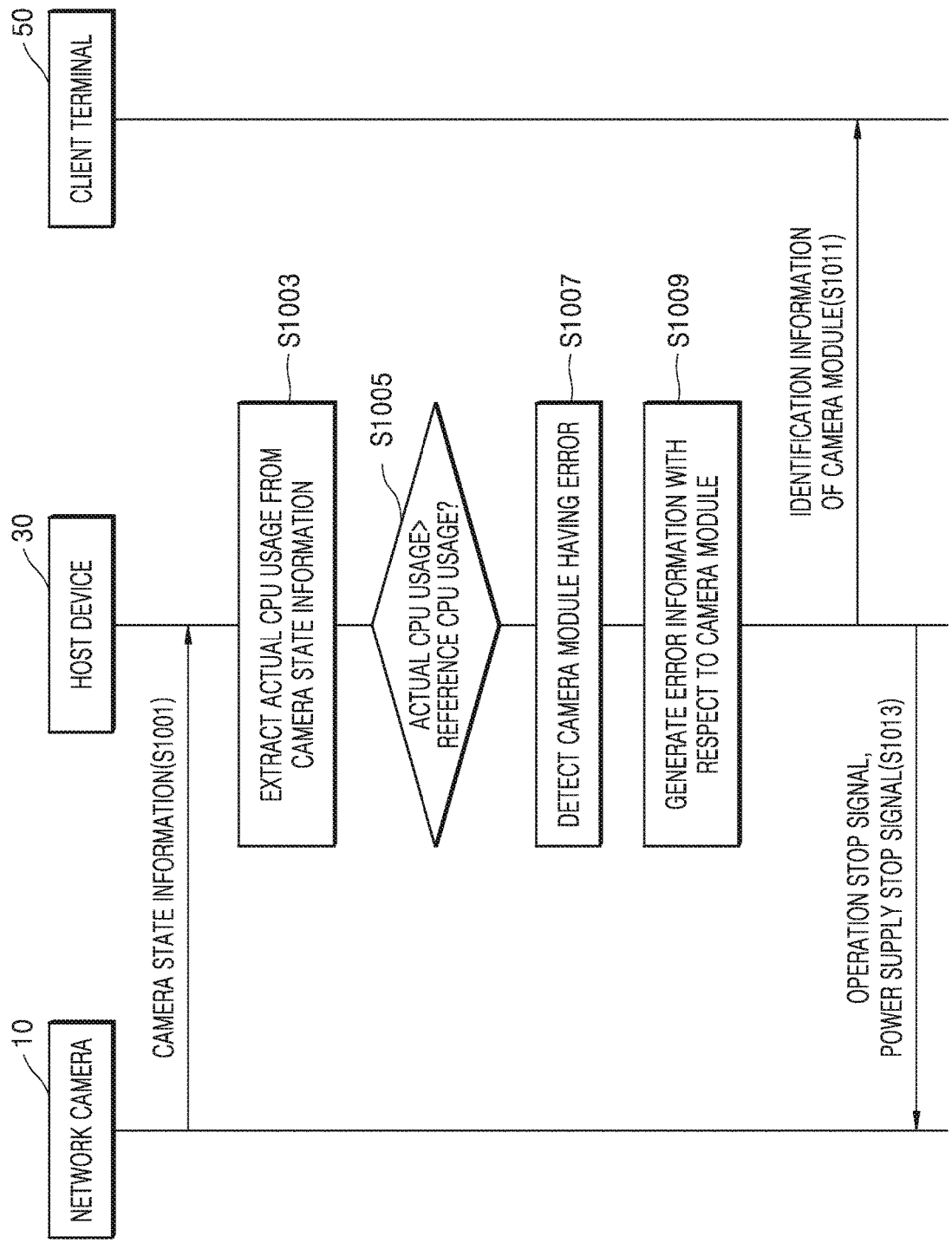
FIG. 10 is a flowchart for explaining an image providing method according to an embodiment.

FIG. 10 is a flowchart for explaining an image providing method according to an example embodiment.

Referring to FIG. 10, the internal communication interface 110 of the host device 30 receives camera state information from each of a plurality of camera modules included in the network camera 10 in operation S1001.

The processor 130 of the host device 30 extracts actual CPU usage from the camera state information in operation S1003.

The processor 130 of the host device 30 may extract actual memory usage from the camera state information.

Thereafter, the processor 130 compares the actual CPU usage with reference CPU usage in operation S1005.

The processor 130 may compare the actual memory usage with reference memory usage.

The processor 130 detects a camera module having the actual CPU usage exceeding the reference CPU usage as at least one camera module having a CPU error in operation S1007 and generates error information with respect to the at least one camera module in operation S1009.

Thereafter, the external communication interface 120 of the host device 30 transmits identification information about the camera module, which is detected in operation S1007, to the client terminal 50 in operation S1011.

The internal communication interface 110 of the host device 30 transmits at least one of an operation stop signal, a power supply stop signal, and a rebooting signal to the network camera 10 in operation S1013. At this time, the internal communication interface 110 may transmit at least one of the operation stop signal and the power supply stop signal to the camera module, which is detected in operation S1007.

Hereinafter, descriptions of the same part as described above will be omitted or made brief.

Figure 11:
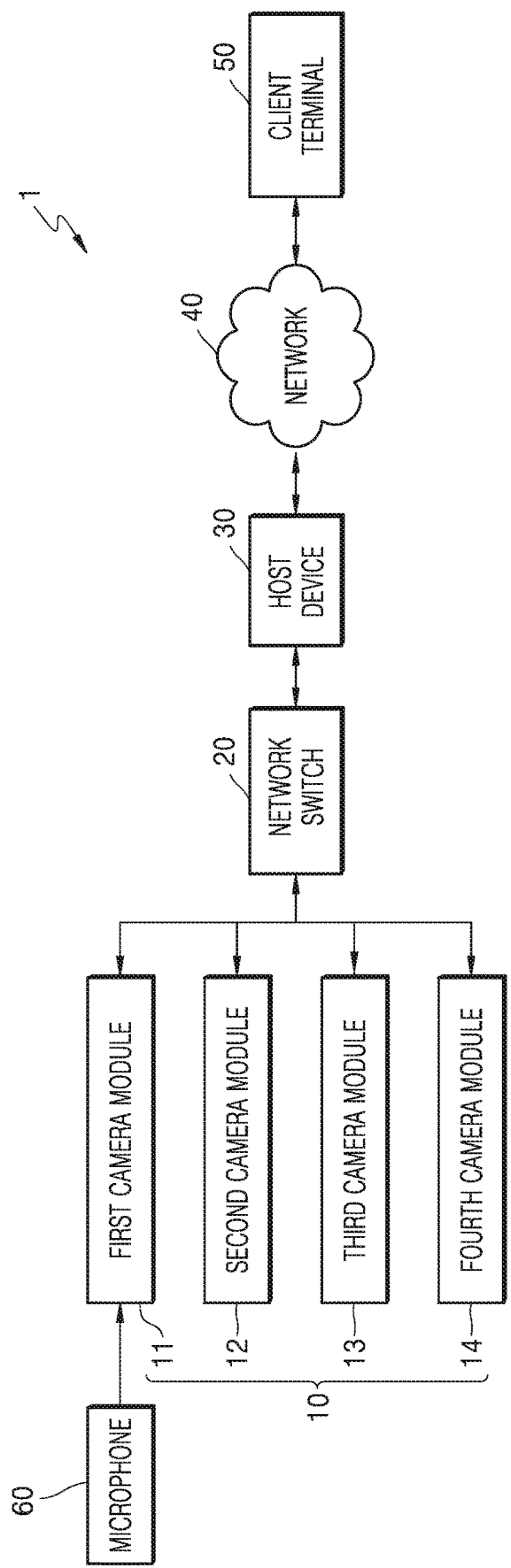
FIG. 11 is a diagram for explaining a monitoring system according to an embodiment.

FIG. 11 is a diagram for explaining the monitoring system 1 according to an example embodiment.

Referring to FIG. 11, the monitoring system 1 includes the network camera 10, the network switch 20, the host device 30, the network 40, and the client terminal 50.

The network camera 10 obtains audio data produced in a monitored area.

The network camera 10 may be electrically connected to a microphone 60 which is provided outside the network camera 10 or may have the microphone 60 installed therein.

One of a plurality of camera modules included in the network camera 10 may be connected to the microphone 60. The microphone 60 may obtain audio data, which is sensed in the shooting direction of the camera module connected to the microphone. Accordingly, the network camera 10 may obtain actual audio data in one direction.

For example, when, among the first through fourth camera modules 11 through 14 included in the network camera 10, only the first camera module 11 is connected to the microphone 60, the network camera 10 may obtain actual audio data sensed in the shooting direction of the first camera module 11.

Hereinafter, audio data corresponding to the first camera module 11 is referred to as first audio data, audio data corresponding to the second camera module 12 is referred to as second audio data, audio data corresponding to the third camera module 13 is referred to as third audio data, and audio data corresponding to the fourth camera module 14 is referred to as fourth audio data. Here, the first audio data may be actual audio data and the second through fourth audio data may be virtual audio data.

The network camera 10 may encode audio data and transmit an encoded audio data to the host device 30 via the network switch 20.

The host device 30 transmits audio, which is obtained by a plurality of camera modules and received from the network switch 20, to the client terminal 50 at a user's request.

The internal communication interface 110 of the host device 30 may transmit a request for actual audio data to a camera module connected to the microphone 60 and may receive the actual audio data from the camera module connected to the microphone 60.

The internal communication interface 110 of the host device 30 may transmit a request for an actual audio configuration setting to a camera module connected to the microphone 60.

The internal communication interface 110 of the host device 30 may transmit a request for a virtual audio configuration setting to a camera module not connected to the microphone 60.

According to the Open Network Video Interface Forum (ONVIF) standard, a media profile includes a video encoder configuration, a video source configuration, an audio encoder configuration, an audio source configuration, an audio decoder configuration, an audio output configuration, a PTZ configuration, an analytics configuration, and a metadata configuration.

An audio configuration may include at least one of the audio source configuration, the audio encoder configuration, and the audio output configuration.

The audio source configuration may include references for an audio source.

The audio encoder configuration may include encoding, a bitrate, and a sample rate. The audio encoder configuration may further include a codec and a gain.

The audio output configuration may include a source token, an output level, and send-primacy.

The external communication interface 120 of the host device 30 may receive a request for audio data, which corresponds to a camera module connected to the microphone 60, from the client terminal 50 and transmit actual audio data to the client terminal 50.

The external communication interface 120 of the host device 30 may receive a request for audio data, which corresponds to a camera module not connected to the microphone 60, from the client terminal 50 and transmit actual audio data to the client terminal 50.

The external communication interface 120 of the host device 30 may receive a request for an audio configuration setting, which corresponds to a camera module connected to the microphone 60, from the client terminal 50.

The client terminal 50 may play or store audio data transmitted from the host device 30.

Figure 12:
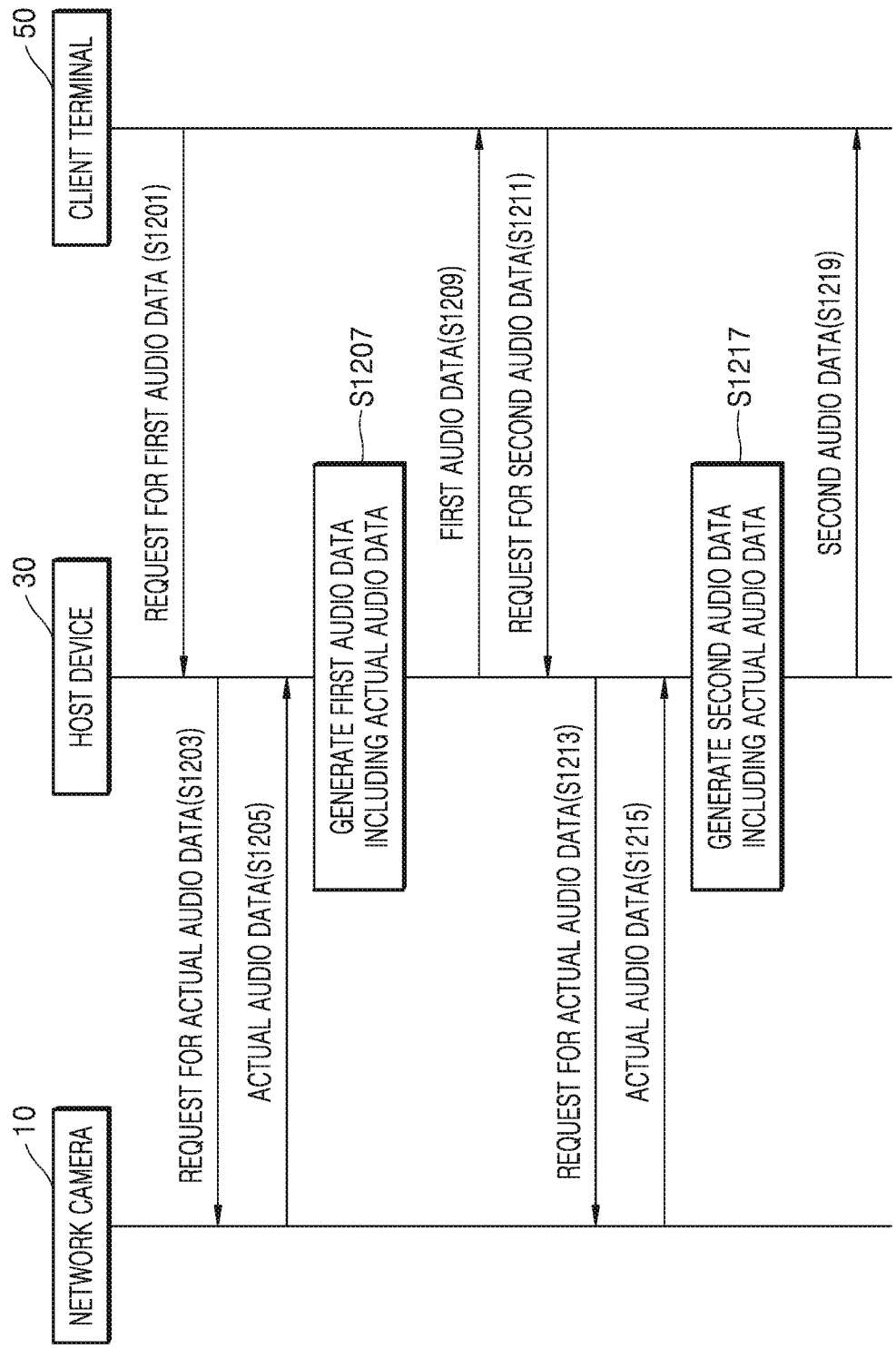
FIG. 12 is a flowchart for explaining an image providing method according to an embodiment.

FIG. 12 is a flowchart for explaining an image providing method according to an example embodiment.

Referring to FIG. 12, when the external communication interface 120 of the host device 30 receives a request for first audio data, which corresponds to the first camera module 11, from the client terminal 50 in operation S1201, the internal communication interface 110 of the host device 30 transmits a request for actual audio data to the first camera module 11 in operation S1203.

Thereafter, the internal communication interface 110 of the host device 30 receives the actual audio data from the first camera module 11 in operation S1205, and the processor 130 of the host device 30 generates the first audio data including the actual audio data in response to the request for the first audio data in operation S1207.

Thereafter, the external communication interface 120 of the host device 30 transmits the first audio data to the client terminal 50 in operation S1209.

As such, as the client terminal 50 requests audio data of the first camera module 11, which is connected to the microphone 60, from the host device 30, the client terminal 50 may receive actual audio data, which is sensed in the shooting direction of the first camera module 11, from the host device 30.

When the external communication interface 120 of the host device 30 receives a request for second audio data, which corresponds to the second camera module 12, from the client terminal 50 in operation S1211, the internal communication interface 110 of the host device 30 transmits the request for the actual audio data to the first camera module 11 in operation S1213.

Thereafter, the internal communication interface 110 of the host device 30 receives the actual audio data from the first camera module 11 in operation S1215, and the processor 130 of the host device 30 generates the second audio data including the actual audio data in response to the request for the second audio data in operation S1217.

Thereafter, the external communication interface 120 of the host device 30 transmits the second audio data to the client terminal 50 in operation S1219. At this time, the host device 30 may transmit the second audio data to the client terminal 50 regardless of video data.

As such, as the client terminal 50 requests audio data of the second camera module 12, which is not connected to the microphone 60, from the host device 30, the client terminal 50 may receive actual audio data, which is sensed in the shooting direction of the first camera module 11, from the host device 30.

According to the current embodiment, audio data of each of the first through fourth camera modules 11 through 14 included in the network camera 10 may be provided even though only one microphone 60 is connected to the network camera 10, so that the monitoring system 1 that follows the ONVIF standard may be provided.

Figure 13:
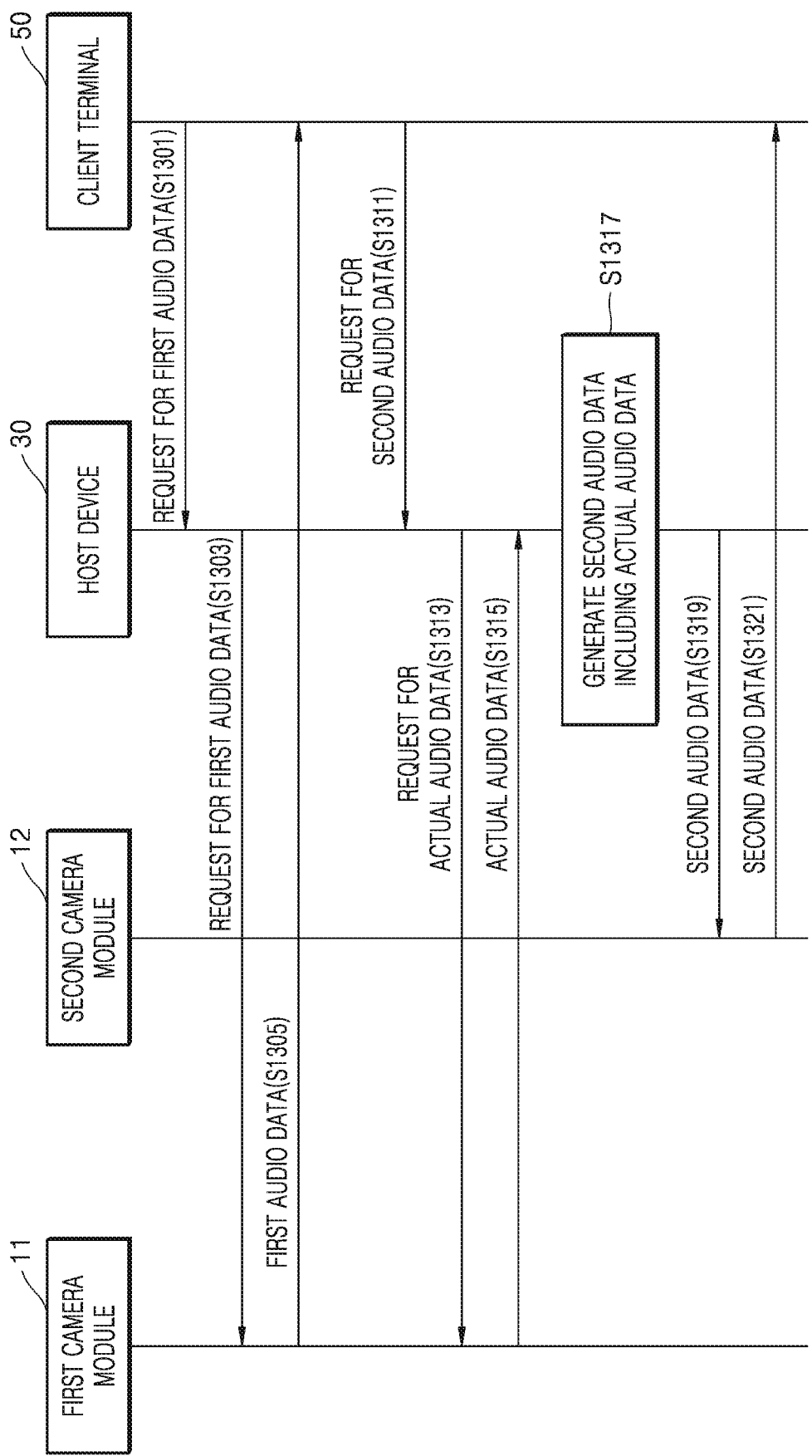
FIG. 13 is a flowchart for explaining an image providing method according to an embodiment.

FIG. 13 is a flowchart for explaining an image providing method according to an embodiment.

Referring to FIG. 13, when the external communication interface 120 of the host device 30 receives a request for first audio data corresponding to the first camera module 11 from the client terminal 50 in operation S1301, the internal communication interface 110 of the host device 30 transmits the request for the first audio data to the first camera module 11 in operation S1303.

The first camera module 11 transmits the first audio data to the client terminal 50 in response to the request for the first audio data in operation S1305.

In other words, as the client terminal 50 requests audio data of the first camera module 11, which is connected to the microphone 60, from the host device 30, the client terminal 50 may receive actual audio data from the first camera module 11.

When the external communication interface 120 of the host device 30 receives a request for second audio data corresponding to the second camera module 12 from the client terminal 50 in operation S1311, the internal communication interface 110 of the host device 30 transmits a request for the actual audio data to the first camera module 11 in operation S1313.

The first camera module 11 transmits the actual audio data to the host device 30 in response to the request for the actual audio data in operation S1315.

Thereafter, the processor 130 of the host device 30 generates the second audio data including the actual audio data in response to the request for the second audio data in operation S1317, and the internal communication interface 110 of the host device 30 transmits the second audio data to the second camera module 12 in operation S1319. The second camera module 12 may multiplex the second audio data and video data. For example, the second camera module 12 may interleave the second audio data with the video data.

The second camera module 12 transmits the second audio data to the client terminal 50 in response to the request for the second audio data in operation S1321. In particular, the second camera module 12 may transmit the video data together with the second audio data to the client terminal 50.

In other words, as the client terminal 50 requests audio data of the second camera module 12, which is not connected to the microphone 60, from the host device 30, the client terminal 50 may receive virtual audio data from the second camera module 12.

FIG. 14 is a flowchart for explaining an image providing method according to an example embodiment.

FIG. 15 is a diagram for explaining the audio configurations of a plurality of camera modules, according to an example embodiment.

Referring to FIG. 14, the external communication interface 120 of the host device 30 receives a request for a first audio configuration setting, which corresponds to the first camera module 11 connected to the microphone 60, from the client terminal 50 in operation S1401.

The processor 130 of the host device 30 generates a request for an actual audio configuration setting and a request for a virtual audio configuration setting in response to the request for the first audio configuration setting in operation S1403.

Thereafter, when the internal communication interface 110 of the host device 30 transmits the request for the actual audio configuration setting to the first camera module 11 in operation S1405, the first camera module 11 updates the actual audio configuration setting in operation S1407.

For example, referring to FIG. 15, the first camera module 11 may set an audio source configuration to an actual audio configuration in response to the request for the actual audio configuration setting. The actual audio configuration may include a first audio source configuration, a first audio encoder configuration, and a first audio output configuration.

Referring back to FIG. 14, when the internal communication interface 110 of the host device 30 transmits the request for the virtual audio configuration setting to the second camera module 12 in operation S1409, the second camera module 12 updates the virtual audio configuration setting in operation S1411.

For example, referring back to FIG. 15, each of the second through fourth camera modules 12 through 14 may set an audio source configuration to a virtual audio configuration in response to the request for the virtual audio configuration setting. The virtual audio configuration may include second through fourth audio source configurations, second through fourth audio encoder configurations, and second through fourth audio output configurations.

At this time, the second through fourth audio source configurations may be the same as the first audio source configuration, the second through fourth audio encoder configurations may be the same as the first audio encoder configuration, and the second through fourth audio output configurations may be the same as the first audio output configuration.

According to the current embodiment, when there is a request for an audio configuration setting with respect to a camera module connected to the microphone 60, not only an audio configuration setting of the camera module connected to the microphone 60 but also an audio configuration setting of a camera module not connected to the microphone 60 are simultaneously updated, so that the monitoring system 1 that is suitable for the ONVIF standards may be provided.

Figure 16:
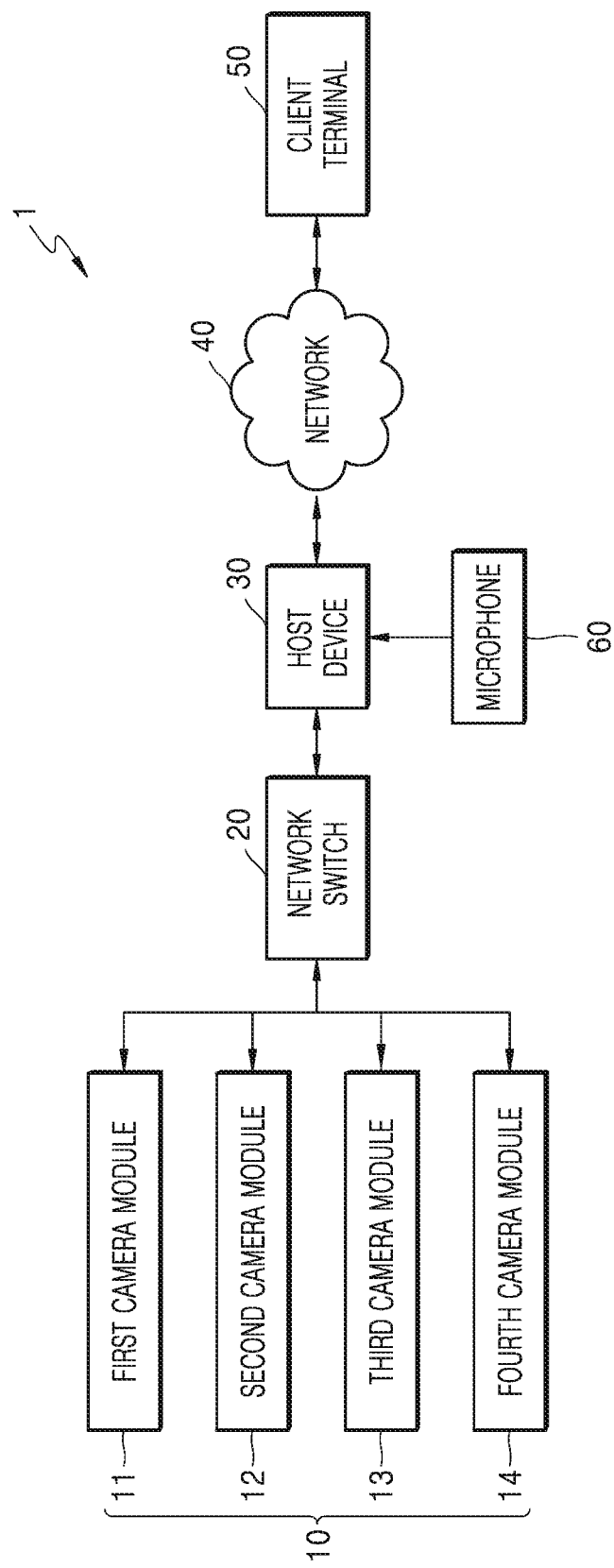
FIG. 16 is a diagram for explaining a monitoring system according to an embodiment.

FIG. 16 is a diagram for explaining a monitoring system according to an example embodiment.

Referring to FIG. 16, the microphone 60 is connected to the host device 30.

The microphone 60 may obtain actual audio data. Accordingly, the host device 30 may obtain the actual audio data sensed in a predetermined direction or in a direction selected by a user.

The host device 30 may provide at least one of image data, which is received from each of the first through fourth camera modules 11 through 14 via the network switch 20, and audio data obtained through the microphone 60 to the client terminal 50.

The external communication interface 120 of the host device 30 may receive a request for certain audio data, which corresponds to a certain camera module included in a plurality of camera modules, from the client terminal 50 and may transmit the certain audio data to the client terminal 50.

The processor 130 of the host device 30 may generate the certain audio data including the actual audio data in response to the request for the certain audio data.

Figure 17:
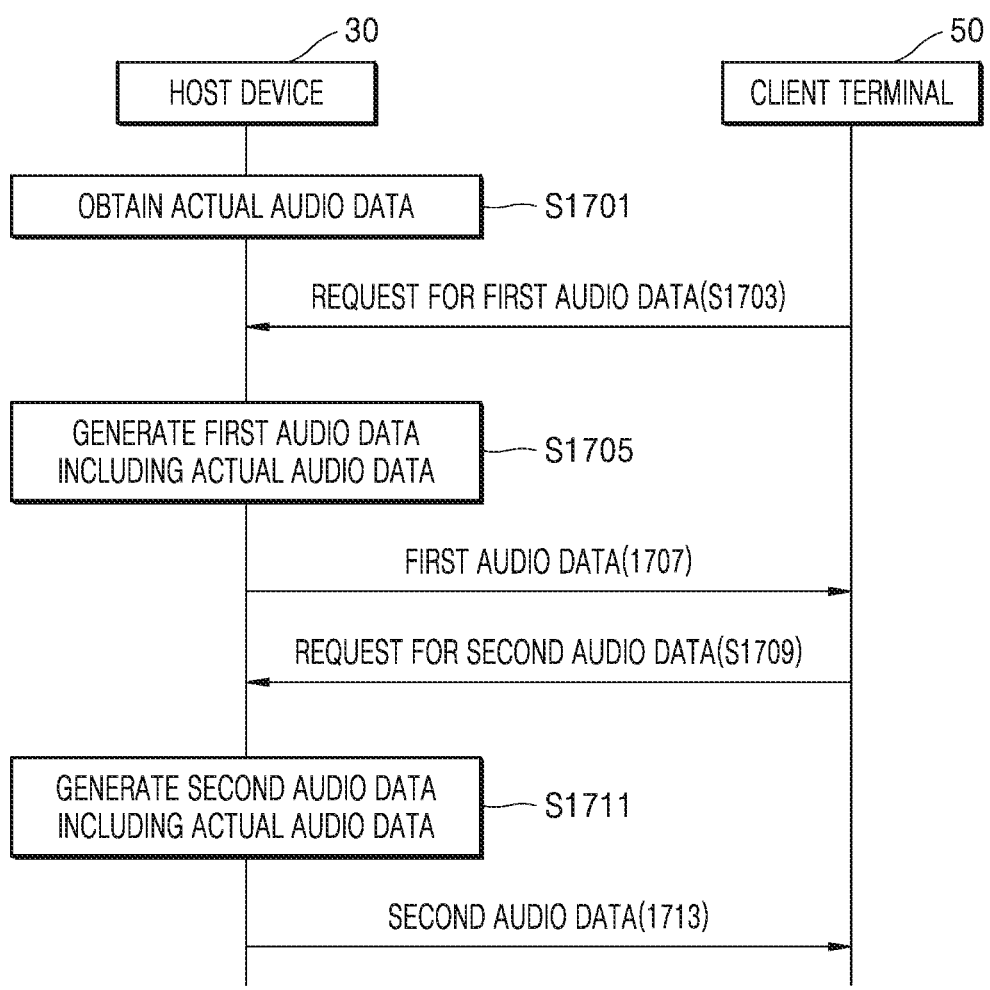
FIG. 17 is a flowchart for explaining an image providing method according to an embodiment.

FIG. 17 is a flowchart for explaining an image providing method according to an example embodiment.

Referring to FIG. 17, the host device 30 obtains actual audio data through the microphone 60 in operation S1701.

When the external communication interface 120 of the host device 30 receives a request for first audio data, which corresponds to the first camera module 11, from the client terminal 50 in operation S1703, the processor 130 of the host device 30 generates first audio data including the actual audio data in operation S1705.

The external communication interface 120 of the host device 30 transmits the first audio data to the client terminal 50 in operation S1707.

When the external communication interface 120 of the host device 30 receives a request for second audio data, which corresponds to the second camera module 12, from the client terminal 50 in operation S1709, the processor 130 of the host device 30 generates second audio data including the actual audio data in operation S1711.

The external communication interface 120 of the host device 30 transmits the second audio data to the client terminal 50 in operation S1713.

According to the current embodiment, the monitoring system 1 may follow the ONVIF standards.

According to example embodiments, there may be provided an image providing apparatus and method for effectively controlling the operation of a network camera including a plurality of camera modules.

According to example embodiments, there may be provided an image providing apparatus and method for efficiently transmitting a plurality of high-resolution image data obtained by a plurality of camera modules.

According to example embodiments, there may be provided an image providing apparatus and method robust to errors.

According to example embodiments, there may be provided an image providing apparatus and method for continuously monitoring a monitored area even in case of emergency.

According to example embodiments, there may be provided an image providing apparatus and method capable of quickly dealing with errors since a camera module having an error may be accurately identified from among a plurality of camera modules.

According to example embodiments, there may be provided an image providing apparatus and method suitable for the ONVIF standards.

It should be understood that embodiments described herein should be considered in a descriptive sense only and not for purposes of limitation. Descriptions of features or aspects within each embodiment should typically be considered as available for other similar features or aspects in other embodiments.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image providing apparatus comprising:
   an internal communication interface configured to receive image data and camera setting information from a plurality of camera modules included in a network camera housing, and transmit a control signal to the plurality of camera modules;
   a processor configured to generate the control signal to control an operation of the plurality of camera modules, control a power supply to each of the plurality of camera modules based on comparison between an actual bit rate of the image data and a set bit rate included in the camera setting information, generate combined image data by combining the image data obtained from the plurality of camera modules; and
   an external communication interface configured to transmit the combined image data to a client terminal via an Internet network.

2. The image providing apparatus of claim 1,
   wherein the processor is further configured to recognize a current version of firmware of at least one camera module of the plurality of camera modules, based on the camera setting information, and generate a firmware upgrade control signal for the at least one camera module in response to the current version being different from a latest version, and
   the internal communication interface is further configured to transmit the firmware upgrade control signal to the at least one camera module.

3. The image providing apparatus of claim 1, wherein the external communication interface is further configured to receive a user input for selecting a resolution from the client terminal,
   the processor is further configured to generate the combined image data having the selected resolution by adjusting a resolution of each of the image data obtained from the plurality of camera modules and then combining the image data, or adjust a resolution of the combined image data to the selected resolution, and
   the internal communication interface is further configured to transmit the combined image data having the selected resolution to the client terminal.

4. The image providing apparatus of claim 1, wherein the plurality of camera modules comprise a first camera module and a second camera module,
   the first camera module is connected to a microphone that generates first audio data, and the second camera module is not connected to the microphone,
   the external communication interface is further configured to receive, from the client terminal, a request for second audio data that requests the second camera module to obtain the second audio data through the microphone,
   the internal communication interface is further configured to transmit a request for the first audio data to the first camera module, receive the first audio data from the first camera module, and transmit the first audio data as the second audio data, to the second camera module, in response to the request for the second audio data.

5. The image providing apparatus of claim 4, wherein the external communication interface is further configured to receive the request for the first audio data from the client terminal, and
the internal communication interface is further configured to transmit the request for the first audio data to the first camera module.

6. The image providing apparatus of claim 1, wherein the plurality of camera modules comprise a first camera module and a second camera module,
the first camera module is connected to a microphone, and the second camera module is not connected to the microphone,
the external communication interface is further configured to receive, from the client terminal, a request for a first audio configuration setting corresponding to the first camera module,
the processor is further configured to generate a request for an actual audio configuration setting and a request for a virtual audio configuration setting in response to the request for the first audio configuration setting, and
the internal communication interface is further configured to transmit the request for the actual audio configuration setting to the first camera module and transmits the request for the virtual audio configuration setting to the second camera module.

7. The image providing apparatus of claim 6, wherein the actual audio configuration setting comprises at least one of an audio source configuration of the first camera module, an audio encoder configuration of the first camera module, and an audio output configuration of the first camera module.

8. The image providing apparatus of claim 1, further comprising a microphone configured to obtain actual audio data,
wherein the external communication interface is further configured to receive a request for predetermined audio data from the client terminal and transmit the predetermined audio data to the client terminal, wherein the predetermined audio data corresponds to a predetermined camera comprised in the plurality of camera modules, and
the processor is further configured to generate the predetermined audio data including the actual audio data in response to the request for the predetermined audio data.

9. The image providing apparatus of claim 1, wherein each of the plurality of camera modules comprises an image signal processor that is independent of the processor.

10. An image providing apparatus comprising:
an internal communication interface configured to receive image data and camera setting information from a plurality of camera modules included in a network camera housing, and transmit a control signal to the plurality of camera modules;
a processor configured to generate the control signal to control an operation of the plurality of camera modules, control a power supply to each of the plurality of camera modules based on at least one of the image data and the camera setting information, generate combined image data by combining the image data obtained from the plurality of camera modules; and
an external communication interface configured to transmit the combined image data to a client terminal via an Internet network,
wherein the processor is further configured to detect at least one camera module that produces an error in the image data, among the plurality of camera modules, and generate error information with respect to the at least one camera module,
the error information comprises identification information about the at least one camera module, and at least one of an operation stop signal, a power supply stop signal, and a rebooting signal,
the internal communication interface transmits the at least one of the operation stop signal, the power supply stop signal, and the rebooting signal to the at least one camera module, and
the external communication interface transmits the identification information to the client terminal.

11. The image providing apparatus of claim 10, wherein the processor is further configured to extract a set frame rate or a set bitrate from the camera setting information, extract an actual frame rate or an actual bitrate from the image data, determine whether the actual frame rate is equal to the set frame rate or whether the actual bitrate is equal to the set bitrate; and detects a camera module, which has the actual frame rate different from the set frame rate or the actual bitrate different from the set bitrate, as the at least one camera module that produces the error is in the image data, among the plurality of camera modules.

12. The image providing apparatus of claim 11, wherein the processor is further configured to determine whether a dynamic frame rate setting or a dynamic bitrate setting has been activated based on the camera setting information and determine normality or abnormality of the image data in response to the dynamic frame rate setting or the dynamic bitrate setting being deactivated.

13. An image providing apparatus comprising:
an internal communication interface configured to receive image data and camera setting information from a plurality of camera modules included in a network camera housing, and transmit a control signal to the plurality of camera modules;
a processor configured to generate the control signal to control an operation of the plurality of camera modules, control a power supply to each of the plurality of camera modules based on at least one of the image data and the camera setting information, generate combined image data by combining the image data obtained from the plurality of camera modules; and
an external communication interface configured to transmit the combined image data to a client terminal via an Internet network,
wherein the internal communication interface is further configured to receive camera state information from each of the plurality of camera modules,
the processor is further configured to extract actual central processing unit (CPU) usage from the camera state information, compare the actual CPU usage with reference CPU usage, detect at least one camera module of which the actual CPU usage exceeds the reference CPU usage, as having a CPU error, and generate error information with respect to the at least one camera module,
the error information comprises identification information about the at least one camera module, and at least one of an operation stop signal, a power supply stop signal, and a rebooting signal,
the internal communication interface is further configured to transmit the at least one of the operation stop signal, the power supply stop signal, and the rebooting signal to the at least one camera module, and the external communication interface is further configured to transmit the identification information to the client terminal.

14. An image providing apparatus comprising:

an internal communication interface configured to receive image data and camera setting information from a plurality of camera modules included in a network camera housing, and transmit a control signal to the plurality of camera modules;

a processor configured to generate the control signal to control an operation of the plurality of camera modules, control a power supply to each of the plurality of camera modules based on at least one of the image data and the camera setting information, generate combined image data by combining the image data obtained from the plurality of camera modules; and an external communication interface configured to transmit the combined image data to a client terminal via an Internet network, wherein the plurality of camera modules comprise a first camera module and a second camera module, the first camera module is connected to a microphone that generates first audio data, and the second camera module is not connected to the microphone, the external communication interface is further configured to receive, from the client terminal, a request for second audio data that requests the second camera module to obtain the second audio data through the microphone, the internal communication interface is further configured to transmit a request for the first audio data to the first camera module and receive the first audio data from the first camera module, and the processor is further configured to generate the second audio data including the first audio data in response to the request for the second audio data.

15. The image providing apparatus of claim 14, wherein the external communication interface is further configured to receive the request for the first audio data and transmit the first audio data to the client terminal, the internal communication interface is further configured to transmit the request for the first audio data to the first camera module and receive, from the first camera module the first audio data that is generated from the microphone, and the processor is further configured to generate the first audio data in response to the request for the first audio data.

16. An image providing method comprising:

receiving, by an internal communication interface, image data and camera setting information from a plurality of camera modules included in a network camera housing;

detecting at least one camera module that produces an error in the image data, among the plurality of camera modules, in response to a difference between an actual bit rate of the at least one camera module and a pre-set bit rate of the at least one camera module being greater than a threshold value, or in response to a difference between an actual frame rate of the at least one camera module and a pre-set frame rate of the at least one camera module being greater than a threshold value;

generating identification information about the at least one camera module, and at least one of an operation stop signal and a power supply stop signal;

transmitting the identification information to a client terminal via an Internet network, by an external communication module; and transmitting the at least one of the operation stop signal and the power supply stop signal to the at least one camera module, by the internal communication interface.

17. The image providing method of claim 16, further comprising:

determining that a dynamic bitrate setting and a dynamic frame rate setting are deactivated before performing an operation of the detecting the at least one camera module that produces the error in the image, among the plurality of camera modules.

* * * * *